(12) United States Patent
Ryu et al.

(10) Patent No.: US 12,707,463 B2
(45) Date of Patent: Aug. 11, 2026

(54) ALIGNED DOWNLINK CONTROL CHANNEL RECEPTION IN MULTI-DOWNLINK CONTROL INFORMATION MULTI-TRANSMISSION RECEPTION POINT SCENARIOS

(71) Applicant: QUALCOMM Incorporated, San Diego, CA (US)

(72) Inventors: Jae Ho Ryu, San Diego, CA (US); Mostafa Khoshnevisan, San Diego, CA (US); Hobin Kim, San Diego, CA (US); Hari Sankar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 684 days.

(21) Appl. No.: 18/296,892

(22) Filed: Apr. 6, 2023

(65) Prior Publication Data

US 2024/0340898 A1 Oct. 10, 2024

(51) Int. Cl.
*H04W 72/00* (2023.01)
*H04W 72/1273* (2023.01)
*H04W 72/23* (2023.01)
*H04W 72/51* (2023.01)

(52) U.S. Cl.
CPC ....... *H04W 72/1273* (2013.01); *H04W 72/23* (2023.01); *H04W 72/51* (2023.01)

(58) Field of Classification Search
None
See application file for complete search history.

(56) References Cited

U.S. PATENT DOCUMENTS

2022/0015055 A1* 1/2022 Taherzadeh Boroujeni ................ H04W 72/23
2022/0053468 A1* 2/2022 Chen ..................... H04L 5/0035
2022/0217647 A1* 7/2022 Matsumura ......... H04W 52/146
2022/0330301 A1* 10/2022 Huang .................. H04L 5/0044
2023/0051117 A1* 2/2023 Tsai ...................... H04L 5/0048
2023/0132212 A1* 4/2023 Gao ...................... H04L 1/1812 370/329
2024/0179719 A1* 5/2024 Song ..................... H04L 5/0053

FOREIGN PATENT DOCUMENTS

WO WO2021035544 A1 * 3/2021 ............ H04W 72/00

* cited by examiner

*Primary Examiner* — Abdelillah Elmejjarmi
(74) *Attorney, Agent, or Firm* — Holland & Hart LLP

(57) ABSTRACT

Methods, systems, and devices for wireless communication are described. A user equipment (UE) receives physical downlink control channels from transmission and reception points (TRPs). The physical downlink control channels may be jointly decoded to facilitate joint demodulation of physical shared channels. The UE receives a first downlink control information (DCI) over a first downlink control channel associated with a first TRP and a second DCI over a second downlink control channel associated with a second TRP. The first downlink control channel overlaps in time with the second downlink control channel. The first DCI schedules a first downlink shared channel associated with the first TRP and the second DCI schedules a second downlink shared channel associated with the second TRP. The UE receives the first downlink shared channel and the second downlink shared channel that overlap in time. The UE performs joint demodulation of the first and second downlink shared channels.

30 Claims, 18 Drawing Sheets

705-a
PDCCH Slot
710-a
Non-PDCCH Slot
705-b
PDCCH Slot
710-b
Non-PDCCH Slot
705-c
PDCCH Slot
710-c
Non-PDCCH Slot
SSS#1 for TRIP1
SSS #1
SSS #1
715
SSS#2 for TRIP1
SSS #2
720
First span
725
Second span
730
700

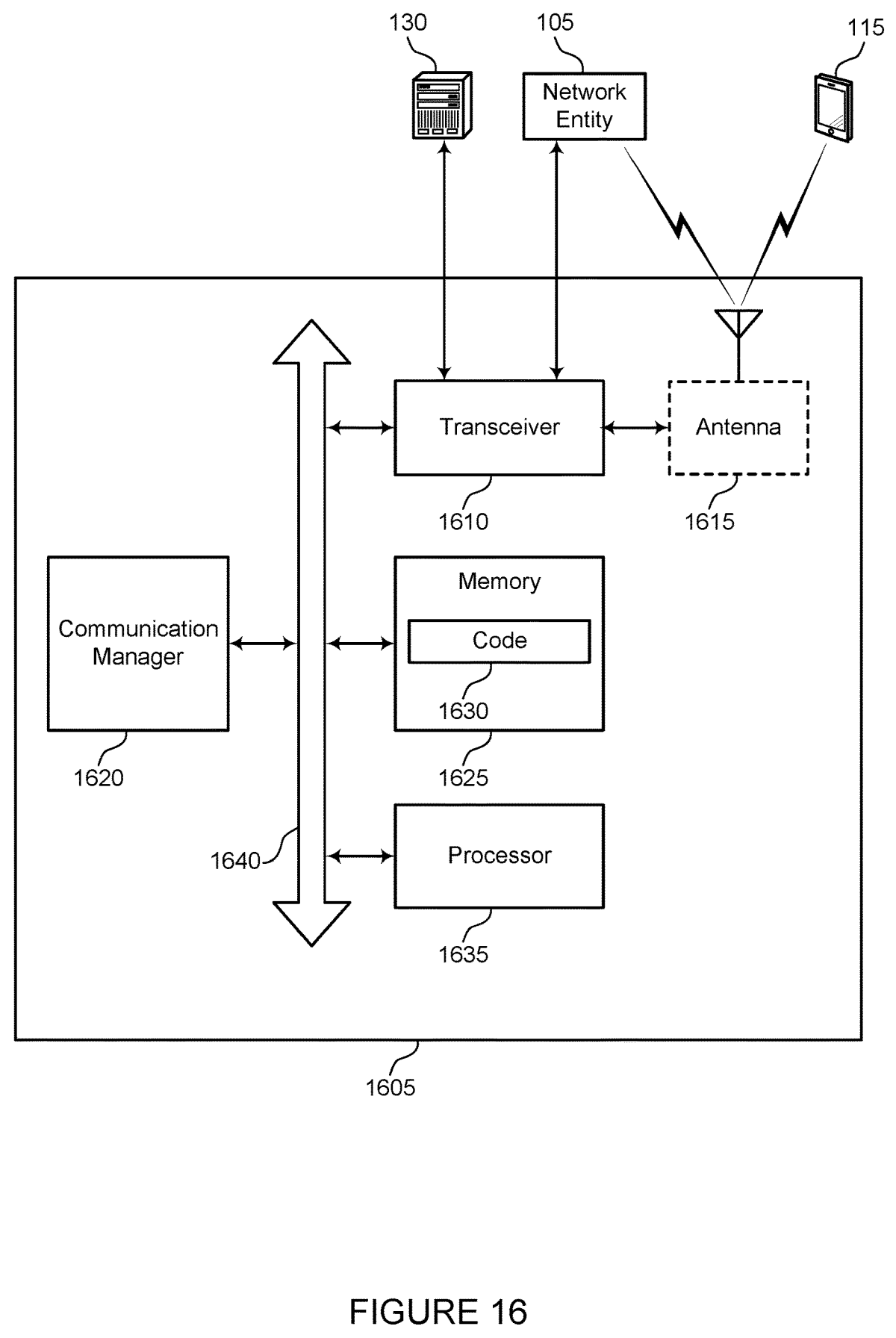

130
105
Network Entity
115
Transceiver
Antenna
1610
1615
Communication Manager
Memory
Code
1630
1620
1625
1640
Processor
1635
1605

FIGURE 16

Figure 17:
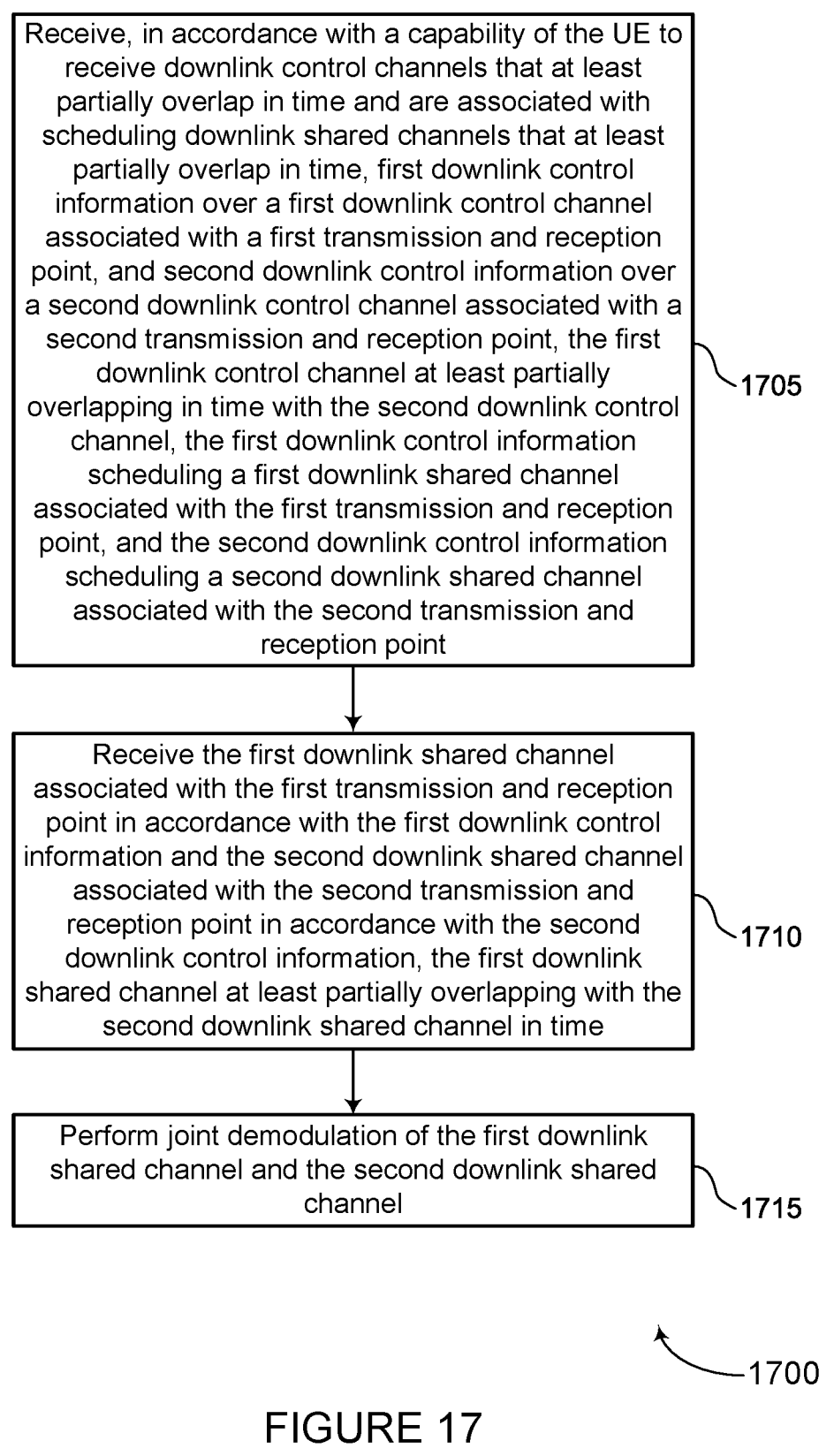

Receive, in accordance with a capability of the UE to receive downlink control channels that at least partially overlap in time and are associated with scheduling downlink shared channels that at least partially overlap in time, first downlink control information over a first downlink control channel associated with a first transmission and reception point, and second downlink control information over a second downlink control channel associated with a second transmission and reception point, the first downlink control channel at least partially overlapping in time with the second downlink control channel, the first downlink control information scheduling a first downlink shared channel associated with the first transmission and reception point, and the second downlink control information scheduling a second downlink shared channel associated with the second transmission and reception point

1705

Receive the first downlink shared channel associated with the first transmission and reception point in accordance with the first downlink control information and the second downlink shared channel associated with the second transmission and reception point in accordance with the second downlink control information, the first downlink shared channel at least partially overlapping with the second downlink shared channel in time

1710

Perform joint demodulation of the first downlink shared channel and the second downlink shared channel

Figure 18:
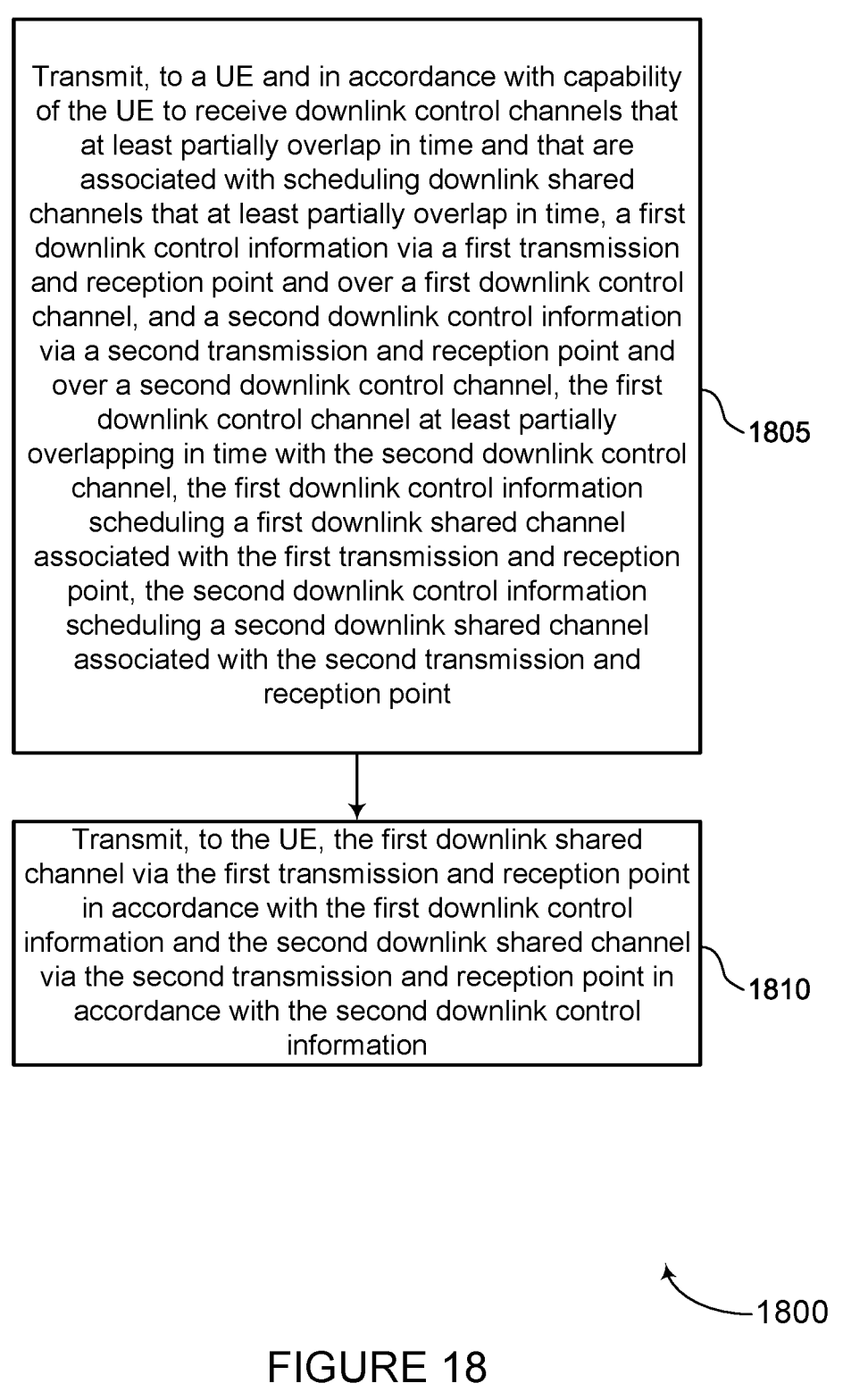

Transmit, to a UE and in accordance with capability of the UE to receive downlink control channels that at least partially overlap in time and that are associated with scheduling downlink shared channels that at least partially overlap in time, a first downlink control information via a first transmission and reception point and over a first downlink control channel, and a second downlink control information via a second transmission and reception point and over a second downlink control channel, the first downlink control channel at least partially overlapping in time with the second downlink control channel, the first downlink control information scheduling a first downlink shared channel associated with the first transmission and reception point, the second downlink control information scheduling a second downlink shared channel associated with the second transmission and reception point

1805

Transmit, to the UE, the first downlink shared channel via the first transmission and reception point in accordance with the first downlink control information and the second downlink shared channel via the second transmission and reception point in accordance with the second downlink control information

ALIGNED DOWNLINK CONTROL CHANNEL RECEPTION IN MULTI-DOWNLINK CONTROL INFORMATION MULTI-TRANSMISSION RECEPTION POINT SCENARIOS

TECHNICAL FIELD

The following relates to wireless communication, including aligned downlink control channel reception in multi-downlink control information multi-transmission reception point scenarios.

DESCRIPTION OF THE RELATED TECHNOLOGY

Wireless communication systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems, which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communication system may include base stations, each supporting wireless communication for communication devices, which may be known as user equipment (UE).

In some deployments, a UE may communicate with a network entity via multiple transmission and reception points (TRPs) associated with a multiple TRP (mTRP) configuration. The UE may have a capability to receive downlink control channels, such as physical downlink control channels (PDCCHs), from each of the multiple TRPs. The PDCCHs may carry downlink control information (DCI) that schedules respective downlink shared channels, such as physical downlink shared channels (PDSCHs), which may carry user data for the UE. That is, each TRP may transmit its own PDCCH carrying respective DCI that schedules an associated PDSCH from the TRP (as opposed to a single DCI scheduling a PDSCH from multiple TRPs). In such a multiple DCI (mDCI) mTRP scenario, a first PDSCH scheduled by a first TRP and a second PDSCH scheduled by a second TRP may overlap in time and/or frequency. The UE may perform joint demodulation on the overlapping PDSCHs without delay when the PDCCHs that schedule the PDSCHs are aligned in time (for example, received at the same time). However, in examples in which the UE does not receive the PDCCHs at the same time so that the PDCCHs are not aligned in time ("time-misaligned"), the UE may wait to decode the PDCCH that arrives second of the PDCCHs, which may cause delay for starting the joint demodulation of the PDSCHs.

SUMMARY

The systems, methods and devices of this disclosure each have several innovative aspects, no single one of which is solely responsible for the desirable attributes disclosed herein.

A method for wireless communication at a user equipment (UE) is described. The method may include receiving, in accordance with a capability of the UE to receive downlink control channels that at least partially overlap in time and that are associated with scheduling downlink shared channels that at least partially overlap in time, first downlink control information (DCI) over a first downlink control channel associated with a first transmission and reception point (TRP), and second DCI over a second downlink control channel associated with a second TRP, the first downlink control channel at least partially overlapping in time with the second downlink control channel, the first DCI scheduling a first downlink shared channel associated with the first TRP, and the second DCI scheduling a second downlink shared channel associated with the second TRP, receiving the first downlink shared channel associated with the first TRP in accordance with the first DCI and the second downlink shared channel associated with the second TRP in accordance with the second DCI, the first downlink shared channel at least partially overlapping with the second downlink shared channel in time, and performing joint demodulation of the first downlink shared channel and the second downlink shared channel.

An apparatus for wireless communication at a UE is described. The apparatus may include a processor, memory coupled with the processor, and instructions stored in the memory. The instructions may be executable by the processor to cause the apparatus to receive, in accordance with a capability of the UE to receive downlink control channels that at least partially overlap in time and that are associated with scheduling downlink shared channels that at least partially overlap in time, first DCI over a first downlink control channel associated with a first TRP, and second DCI over a second downlink control channel associated with a second TRP, the first downlink control channel at least partially overlapping in time with the second downlink control channel, the first DCI scheduling a first downlink shared channel associated with the first TRP, and the second DCI scheduling a second downlink shared channel associated with the second TRP, receive the first downlink shared channel associated with the first TRP in accordance with the first DCI and the second downlink shared channel associated with the second TRP in accordance with the second DCI, the first downlink shared channel at least partially overlapping with the second downlink shared channel in time, and perform joint demodulation of the first downlink shared channel and the second downlink shared channel.

Another apparatus for wireless communication at a UE is described. The apparatus may include means for receiving, in accordance with a capability of the UE to receive downlink control channels that at least partially overlap in time and that are associated with scheduling downlink shared channels that at least partially overlap in time, first DCI over a first downlink control channel associated with a first TRP, and second DCI over a second downlink control channel associated with a second TRP, the first downlink control channel at least partially overlapping in time with the second downlink control channel, the first DCI scheduling a first downlink shared channel associated with the first TRP, and the second DCI scheduling a second downlink shared channel associated with the second TRP, means for receiving the first downlink shared channel associated with the first TRP in accordance with the first DCI and the second downlink shared channel associated with the second TRP in accordance with the second DCI, the first downlink shared channel at least partially overlapping with the second downlink shared channel in time, and means for performing joint demodulation of the first downlink shared channel and the second downlink shared channel.

A non-transitory computer-readable medium storing code for wireless communication at a UE is described. The code may include instructions executable by a processor to receive, in accordance with a capability of the UE to receive downlink control channels that at least partially overlap in time and that are associated with scheduling downlink shared channels that at least partially overlap in time, first DCI over a first downlink control channel associated with a first TRP, and second DCI over a second downlink control channel associated with a second TRP, the first downlink control channel at least partially overlapping in time with the second downlink control channel, the first DCI scheduling a first downlink shared channel associated with the first TRP, and the second DCI scheduling a second downlink shared channel associated with the second TRP, receive the first downlink shared channel associated with the first TRP in accordance with the first DCI and the second downlink shared channel associated with the second TRP in accordance with the second DCI, the first downlink shared channel at least partially overlapping with the second downlink shared channel in time, and perform joint demodulation of the first downlink shared channel and the second downlink shared channel.

In some examples of the method, apparatuses, and non-transitory computer-readable medium described herein, receiving the first DCI and the second DCI may include operations, features, means, or instructions for monitoring a first search space set for the first downlink control channel and a second search space set for the second downlink control channel, where the first search space set may be associated with a first control resource set having a same duration as a second control resource set associated with the second search space set, where the first search space set and the second search space set may have a same slot periodicity and slot offset, where the first search space set and the second search space set may have a same monitoring symbol within each slot, and where the first downlink control channel in the first search space set and the second downlink control channel in the second search space set schedule the first downlink shared channel and the second downlink shared channel associated with a same time offset.

In some examples of the method, apparatuses, and non-transitory computer-readable medium described herein, the first search space set and the second search space set completely align in time.

In some examples of the method, apparatuses, and non-transitory computer-readable medium described herein, receiving the first DCI and the second DCI may include operations, features, means, or instructions for monitoring a first search space set for the first downlink control channel and a second search space set for the second downlink control channel, where the first search space set may be associated with a first control resource set having a different duration than a second control resource set associated with the second search space set, where the first search space set and the second search space set may have a same slot periodicity and slot offset, and where the first downlink control channel in the first search space set and the second downlink control channel in the second search space set schedule the first downlink shared channel and the second downlink shared channel associated with a same time offset.

In some examples of the method, apparatuses, and non-transitory computer-readable medium described herein, each slot of the first search space set and each slot of the second search space set includes a single monitoring symbol in a same downlink control channel monitoring occasion.

In some examples of the method, apparatuses, and non-transitory computer-readable medium described herein, a last orthogonal frequency division multiplexing (OFDM) symbol of the first DCI may be within a threshold symbol quantity of a last OFDM symbol of the second DCI.

In some examples of the method, apparatuses, and non-transitory computer-readable medium described herein, receiving the first DCI and the second DCI may include operations, features, means, or instructions for monitoring a first search space set for the first downlink control channel and a second search space set for the second downlink control channel, where the first search space set may be associated with a first control resource set having a different duration than a second control resource set associated with the second search space set, where the first search space set and the second search space set may have a different slot periodicity, and where the first downlink control channel in the first search space set and the second downlink control channel in the second search space set schedule the first downlink shared channel and the second downlink shared channel associated with a same time offset.

In some examples of the method, apparatuses, and non-transitory computer-readable medium described herein, at least one monitoring symbol of the first search space set at least partially overlaps in time with at least one monitoring symbol of the second search space set.

In some examples of the method, apparatuses, and non-transitory computer-readable medium described herein, the first downlink shared channel and the second downlink shared channel completely align in time and frequency.

In some examples of the method, apparatuses, and non-transitory computer-readable medium described herein, the first downlink shared channel may be received via a first set of frequency resources and the second downlink shared channel may be received via a second set of frequency resources different than the first set of frequency resources.

In some examples of the method, apparatuses, and non-transitory computer-readable medium described herein, the first downlink shared channel and the second downlink shared channel partially overlap in frequency.

A method for wireless communication at a network entity is described. The method may include transmitting, to a UE, and in accordance with capability of the UE to receive downlink control channels that at least partially overlap in time and that are associated with scheduling downlink shared channels that at least partially overlap in time, a first DCI via a first TRP and over a first downlink control channel, and a second DCI via a second TRP and over a second downlink control channel, the first downlink control channel at least partially overlapping in time with the second downlink control channel, the first DCI scheduling a first downlink shared channel associated with the first TRP, the second DCI scheduling a second downlink shared channel associated with the second TRP and transmitting, to the UE, the first downlink shared channel via the first TRP in accordance with the first DCI and the second downlink shared channel via the second TRP in accordance with the second DCI.

An apparatus for wireless communication at a network entity is described. The apparatus may include a processor, memory coupled with the processor, and instructions stored in the memory. The instructions may be executable by the processor to cause the apparatus to transmit, to a UE, and in accordance with capability of the UE to receive downlink control channels that at least partially overlap in time and that are associated with scheduling downlink shared channels that at least partially overlap in time, a first DCI via a first TRP and over a first downlink control channel, and a second DCI via a second TRP and over a second downlink control channel, the first downlink control channel at least partially overlapping in time with the second downlink control channel, the first DCI scheduling a first downlink shared channel associated with the first TRP, the second DCI scheduling a second downlink shared channel associated with the second TRP and transmit, to the UE, the first downlink shared channel via the first TRP in accordance with the first DCI and the second downlink shared channel via the second TRP in accordance with the second DCI.

Another apparatus for wireless communication at a network entity is described. The apparatus may include means for transmitting, to a UE, and in accordance with capability of the UE to receive downlink control channels that at least partially overlap in time and that are associated with scheduling downlink shared channels that at least partially overlap in time, a first DCI via a first TRP and over a first downlink control channel, and a second DCI via a second TRP and over a second downlink control channel, the first downlink control channel at least partially overlapping in time with the second downlink control channel, the first DCI scheduling a first downlink shared channel associated with the first TRP, the second DCI scheduling a second downlink shared channel associated with the second TRP and means for transmitting, to the UE, the first downlink shared channel via the first TRP in accordance with the first DCI and the second downlink shared channel via the second TRP in accordance with the second DCI.

A non-transitory computer-readable medium storing code for wireless communication at a network entity is described. The code may include instructions executable by a processor to transmit, to a UE, and in accordance with capability of the UE to receive downlink control channels that at least partially overlap in time and that are associated with scheduling downlink shared channels that at least partially overlap in time, a first DCI via a first TRP and over a first downlink control channel, and a second DCI via a second TRP and over a second downlink control channel, the first downlink control channel at least partially overlapping in time with the second downlink control channel, the first DCI scheduling a first downlink shared channel associated with the first TRP, the second DCI scheduling a second downlink shared channel associated with the second TRP and transmit, to the UE, the first downlink shared channel via the first TRP in accordance with the first DCI and the second downlink shared channel via the second TRP in accordance with the second DCI.

In some examples of the method, apparatuses, and non-transitory computer-readable medium described herein, a first search space set may be associated with the first downlink control channel and a second search space set may be associated with the second downlink control channel, the first search space set may be associated with a first control resource set having a same duration as a second control resource set associated with the second search space set, the first search space set and the second search space set may have a same slot periodicity and slot offset, the first search space set and the second search space set may have a same monitoring symbol within each slot, and the first downlink control channel in the first search space set and the second downlink control channel in the second search space set schedule the first downlink shared channel and the second downlink shared channel associated with a same time offset.

In some examples of the method, apparatuses, and non-transitory computer-readable medium described herein, the first search space set and the second search space set completely align in time.

In some examples of the method, apparatuses, and non-transitory computer-readable medium described herein, a first search space set may be associated with the first downlink control channel and a second search space set may be associated with the second downlink control channel, the first search space set may be associated with a first control resource set having a different duration than a second control resource set associated with the second search space set, the first search space set and the second search space set may have a same slot periodicity and slot offset, and the first downlink control channel in the first search space set and the second downlink control channel in the second search space set schedule the first downlink shared channel and the second downlink shared channel associated with a same time offset.

In some examples of the method, apparatuses, and non-transitory computer-readable medium described herein, each slot of the first search space set and each slot of the second search space set includes a single monitoring symbol in a same downlink control channel monitoring occasion.

In some examples of the method, apparatuses, and non-transitory computer-readable medium described herein, a last OFDM symbol of the first DCI may be within a threshold symbol quantity of a last OFDM symbol of the second DCI.

In some examples of the method, apparatuses, and non-transitory computer-readable medium described herein, a first search space set may be associated with the first downlink control channel and a second search space set may be associated with the second downlink control channel, the first search space set may be associated with a first control resource set having a different duration than a second control resource set associated with the second search space set, the first search space set and the second search space set may have a different slot periodicity, and the first downlink control channel in the first search space set and the second downlink control channel in the second search space set schedule the first downlink shared channel and the second downlink shared channel associated with a same time offset.

In some examples of the method, apparatuses, and non-transitory computer-readable medium described herein, at least one monitoring symbol of the first search space set at least partially overlaps in time with at least one monitoring symbol of the second search space set.

In some examples of the method, apparatuses, and non-transitory computer-readable medium described herein, the first downlink shared channel and the second downlink shared channel completely align in time and frequency.

In some examples of the method, apparatuses, and non-transitory computer-readable medium described herein, the first downlink shared channel may be transmitted via a first set of frequency resources and the second downlink shared channel may be transmitted via a second set of frequency resources different than the first set of frequency resources.

In some examples of the method, apparatuses, and non-transitory computer-readable medium described herein, the first downlink shared channel and the second downlink shared channel partially overlap in frequency.

BRIEF DESCRIPTION OF THE DRAWINGS

FIG. 16 shows a system including a device that supports aligned downlink control channel reception in mDCI mTRP scenarios in accordance with aspects of the present disclosure.

FIGS. 17 and 18 show flowcharts illustrating methods that support aligned downlink control channel reception in mDCI mTRP scenarios in accordance with aspects of the present disclosure.

DETAILED DESCRIPTION

Figure 1:
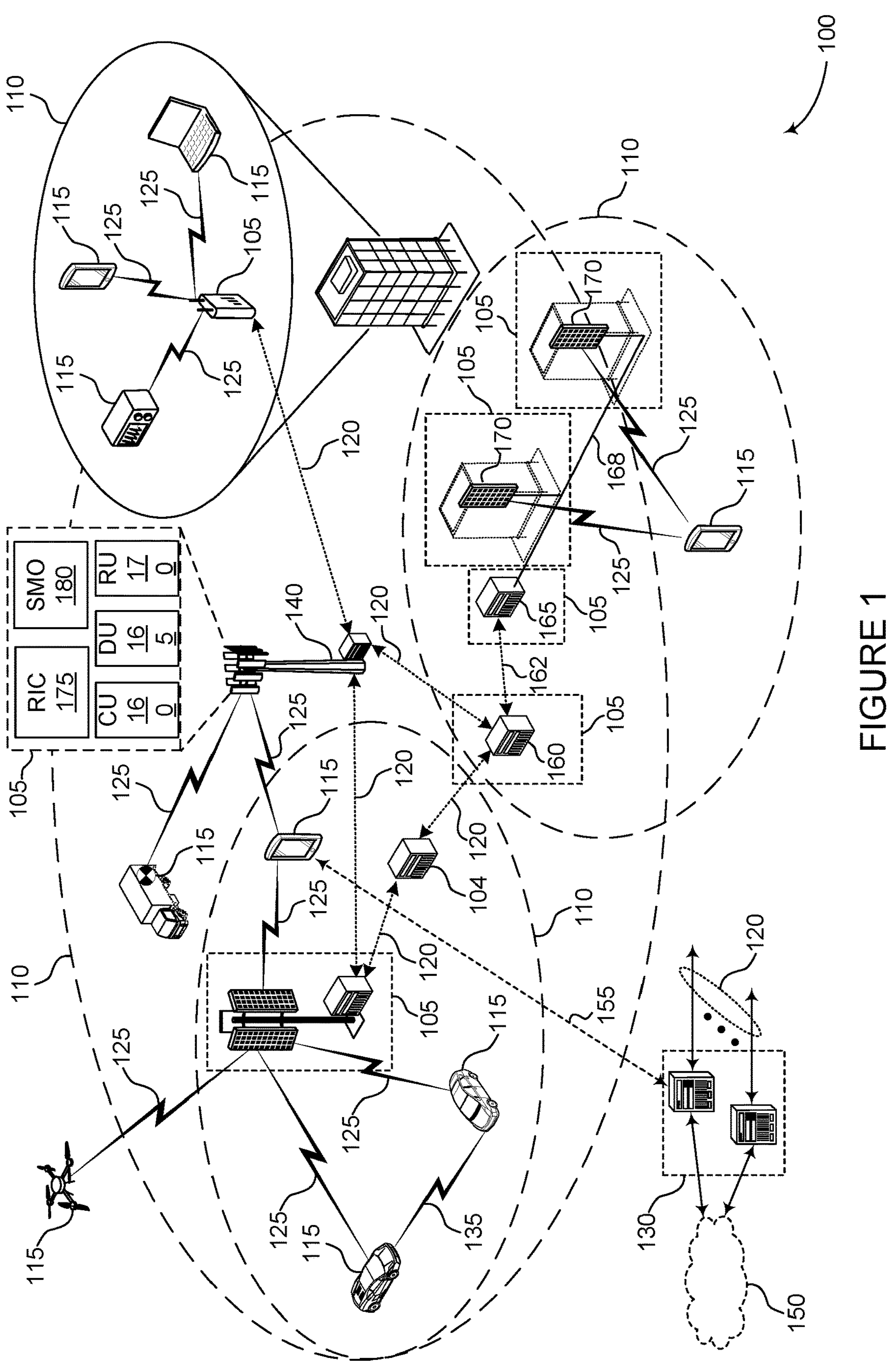
FIG. 1 shows an example of a wireless communication system that supports aligned downlink control channel reception in multi-downlink control information (mDCI) multi-transmission reception point (mTRP) scenarios in accordance with aspects of the present disclosure.

A user equipment (UE) may communicate with a network entity via multiple transmission and reception points (TRPs) associated with a multiple TRP (mTRP) configuration. In some instances or deployments, according to a single downlink control information (DCI) mTRP configuration, a single DCI from one TRP may schedule a physical downlink shared channel (PDSCH) to be collectively transmitted from the multiple TRPs. In some other instances or deployments, according to a multiple DCI (mDCI) mTRP configuration, the multiple TRPs may respectively transmit DCI to the UE via multiple physical downlink control channels (PDCCHs) that schedule multiple PDSCHs from the multiple TRPs. In a mDCI mTRP scenario, a first PDSCH scheduled via a first TRP and a second PDSCH scheduled via a second TRP may overlap in time and/or frequency. The UE may perform joint decoding of the PDCCHs and may perform joint demodulation on the overlapping PDSCHs. For example, the UE may decode the PDCCHs to read control information including a resource allocation for scheduling the multiple PDSCHs. After decoding both of the PDCCHs, the UE receives the PDSCHs over the scheduled resources.

In examples in which the UE receives the PDCCHs at the same time so that the PDCCHs are aligned in time ("time-aligned") in the same PDCCH monitoring occasion, the UE may perform joint demodulation of the PDSCHs without delay. However, in some instances, the PDCCHs carrying the DCI for scheduling the PDSCHs may not be coordinated (for example, may be sent independently from each other via the respective TRPs without alignment of the time and/or frequency resources used to transmit the PDCCHs). When the PDCCHs are not aligned in time ("time-misaligned"), the UE may not be able to decode the PDCCHs at the same time, and as a result, the UE may not be able to jointly demodulate the PDSCHs until after decoding both of the PDCCHs at different times. Accordingly, in examples in which the PDCCHs are time-misaligned, the UE will wait to decode the second PDCCH. Because the decoding of one of the PDCCHs is delayed, joint demodulation of the associated PDSCHs may also be delayed or omitted. For example, the UE may perform a single PDSCH demodulation operation or two overlapped PDSCH demodulation operations for the uncoordinated PDSCH scheduling caused by the time-misaligned PDCCH decoding, resulting in delayed demodulation of the PDSCHs or inefficient use of resources, as separate demodulation of time overlapping PDSCHs may involve the use of more computing and communications resources than joint demodulation.

Various aspects generally relate to aligned reception of downlink control channels (for example, PDCCHs) in an mDCI and mTRP scenario to facilitate joint demodulation of downlink shared channels (for example, PDSCHs) scheduled by the aligned downlink control channels. In some aspects, a UE may transmit, to a network entity, an indication of a capability for receiving downlink control channels (for example, PDCCHs) that partially or fully overlap in time and that respectively schedule downlink shared channels (for example, PDSCHs) that partially or fully overlap in time. For example, a UE may be capable of time-aligned PDCCH reception that includes completely aligned PDCCH reception, span-aligned PDCCH reception, or partial-span-aligned PDCCH reception. In various examples, the UE receives a first DCI over a first downlink control channel from a first TRP, and a second DCI over a second downlink control channel from a second TRP. The first downlink control channel overlaps in time with the second downlink control channel. To facilitate joint demodulation and decoding, the UE is capable of time-aligned or time-overlapping PDCCH reception for scheduling of time-overlapping PDSCHs. The indication of the capability transmitted by the UE to the network enables the network to transmit time-aligned or time-overlapping PDCCHs that schedule time-overlapping PDSCHs in accordance with the capability of the UE. For example, the capability of the UE may be signaled to the network in capability signaling. In some other examples, the capability of the UE may be standardized (for example, predefined or otherwise known to the network).

Particular aspects of the subject matter described in this disclosure may be implemented to realize the following potential advantages. The techniques employed by the described communication devices may reduce or prevent delayed decoding and demodulation of PDSCHs. For example, operations performed by the described communication devices may provide improvements to decoding and demodulation of PDSCHs by reducing or eliminating reception of PDCCHs at different times (for example, time-misaligned reception) that would otherwise result in delayed decoding and demodulation of the PDSCHs. For example, the network may transmit PDCCHs from multiple TRPs in accordance with the UE's capability such that the PDSCHs scheduled by the PDCCHS may be jointly demodulated without delay. For example, the network may schedule PDCCHs according to the UE's capability for completely-aligned PDCCH reception, span-aligned PDCCH reception, or partial-span-aligned PDCCH reception, in order to reduce or eliminate separate demodulation of time-overlapping PDSCHs and enable joint-demodulation of such time-overlapping PDSCHs.

Aspects of the disclosure are initially described in the context of wireless communication systems. Aspects of the disclosure are further illustrated by and described with reference to apparatus diagrams, system diagrams, and flowcharts that relate to aligned downlink control channel reception in mDCI mTRP scenarios.

FIG. 1 shows an example of a wireless communication system 100 that supports aligned downlink control channel reception in mDCI mTRP scenarios in accordance with aspects of the present disclosure. The wireless communication system 100 may include network entities 105, UEs 115, and a core network 130. In some examples, the wireless communication system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communication system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication links 125 (for example, a radio frequency (RF) access link). For example, a network entity 105 may support a coverage area 110 (for example, a geographic coverage area) over which the UEs 115 and the network entity 105 may establish communication links 125. The coverage area 110 may be an example of a geographic area over which a network entity 105 and a UE 115 may support the communication of signals according to radio access technologies (RATs).

The UEs 115 may be dispersed throughout a coverage area 110 of the wireless communication system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communication with various types of devices, such as other UEs 115 or network entities 105, as shown in FIG. 1.

As described herein, a node of the wireless communication system 100, which may be referred to as a network node, or a wireless node, may be a network entity 105 (for example, any network entity described herein), a UE 115 (for example, any UE described herein), a network controller, an apparatus, a device, a computing system, components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, among other examples may include disclosure of the UE 115, network entity 105, apparatus, device, computing system, or among other examples being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via backhaul communication links 120 (for example, in accordance with an S1, N2, N3, or other interface protocol). In some examples, network entities 105 may communicate with one another via a backhaul communication link 120 (for example, in accordance with an X2, Xn, or other interface protocol) either directly (for example, directly between network entities 105) or indirectly (for example, via a core network 130). In some examples, network entities 105 may communicate with one another via a midhaul communication link 162 (for example, in accordance with a midhaul interface protocol) or a fronthaul communication link 168 (for example, in accordance with a fronthaul interface protocol), or any combination thereof. The backhaul communication links 120, midhaul communication links 162, or fronthaul communication links 168 may be or include wired links (for example, an electrical link, an optical fiber link), wireless links (for example, a radio link, a wireless optical link), among other examples or various combinations thereof. A UE 115 may communicate with the core network 130 via a communication link 155.

The network entities 105 described herein may include or may be referred to as a base station 140 (for example, a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (for example, a base station 140) may be implemented in an aggregated (for example, monolithic, standalone) base station architecture, which may be configured to utilize a protocol stack that is physically or logically integrated within a single network entity 105 (for example, a single RAN node, such as a base station 140).

In some examples, a network entity 105 may be implemented in a disaggregated architecture (for example, a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (for example, a network configuration sponsored by the O-RAN Alliance), or a virtualized RAN (vRAN) (for example, a cloud RAN (C-RAN)). For example, a network entity 105 may include a central unit (CU) 160, a distributed unit (DU) 165, a radio unit (RU) 170, a RAN Intelligent Controller (RIC) 175 (for example, a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). Components of the network entities 105 in a disaggregated RAN architecture may be co-located, or components of the network entities 105 may be located in distributed locations (for example, separate physical locations). In some examples, network entities 105 of a disaggregated RAN architecture may be implemented as virtual units (for example, a virtual CU (VCU), a virtual DU (VDU), a virtual RU (VRU)).

The split of functionality between a CU 160, a DU 165, and an RU 170 is flexible and may support different functionalities depending on which functions (for example, network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support layers of the protocol stack and the DU 165 may support different layers of the protocol stack. In some examples, the CU 160 may host upper protocol layer (for example, layer 3 (L3), layer 2 (L2)) functionality and signaling (for example, Radio Resource Control (RRC), service data adaption protocol (SDAP), Packet Data Convergence Protocol (PDCP)). The CU 160 may be connected to DUs 165 or RUs 170, and the DUs 165 or RUs 170 may host lower protocol layers, such as layer 1 (L1) (for example, physical (PHY) layer) or L2 (for example, radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support layers of the protocol stack and the RU 170 may support different layers of the protocol stack. The DU 165 may support one or multiple different cells (for example, via RUs 170). In some cases, a functional split between a CU 160 and a DU 165, or between a DU 165 and an RU 170 may be within a protocol layer (for example, some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to DUs 165 via a midhaul communication link 162 (for example, F1, F1-c, F1-u), and a DU 165 may be connected to RUs 170 via a fronthaul communication link 168 (for example, open fronthaul (FH) interface). In some examples, a midhaul communication link 162 or a fronthaul communication link 168 may be implemented in accordance with an interface (for example, a channel) between layers of a protocol stack supported by respective network entities 105 that are in communication via such communication links.

In wireless communication systems (for example, wireless communication system 100), infrastructure and spectral resources for radio access may support wireless backhaul link capabilities to supplement wired backhaul connections, providing an IAB network architecture (for example, to a core network 130). In some cases, in an IAB network, network entities 105 (for example, IAB nodes 104) may be partially controlled by each other. The IAB nodes 104 may be referred to as a donor entity or an IAB donor. The DUs 165 or RUs 170 may be partially controlled by CUs 160 associated with a donor network entity 105 (for example, a donor base station 140). The donor network entities 105 (for example, IAB donors) may be in communication with additional network entities 105 (for example, IAB nodes 104) via supported access and backhaul links (for example, backhaul communication links 120). IAB nodes 104 may include an IAB mobile termination (IAB-MT) controlled (for example, scheduled) by DUs 165 of a coupled IAB donor. An IAB-MT may include an independent set of antennas for relay of communication with UEs 115, or may share the same antennas (for example, of an RU 170) of an IAB node 104 used for access via the DU 165 of the IAB node 104 (for example, referred to as virtual IAB-MT (vIAB-MT)). In some examples, the IAB nodes 104 may include DUs 165 that support communication links with additional entities (for example, IAB nodes 104, UEs 115) within the relay chain or configuration of the access network (for example, downstream). In such cases, components of the disaggregated RAN architecture (for example, IAB nodes 104 or components of IAB nodes 104) may be configured to operate according to the techniques described herein.

In the case of the techniques described herein applied in the context of a disaggregated RAN architecture, components of the disaggregated RAN architecture may be configured to support aligned downlink control channel reception in mDCI mTRP scenarios as described herein. For example, some operations described as being performed by a UE 115 or a network entity 105 (for example, a base station 140) may additionally, or alternatively, be performed by components of the disaggregated RAN architecture (for example, IAB nodes 104, DUs 165, CUs 160, RUs 170, RIC 175, SMO 180).

A UE 115 may include or may be referred to as a mobile device, a wireless communication device, a remote device, a handheld device, or a subscriber device, or some other suitable terminology, in which the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communication (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via communication links 125 (for example, an access link) using resources associated with carriers. The term "carrier" may refer to a set of RF spectrum resources having a defined physical layer structure for supporting the communication links 125. For example, a carrier used for a communication link 125 may include a portion of a RF spectrum band (for example, a bandwidth part (BWP)) that is operated according to physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communication system 100 may support communication with a UE 115 using carrier aggregation or multi-carrier operation. A UE 115 may be configured with multiple downlink component carriers and uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (for example, entity, sub-entity) of a network entity 105. For example, the terms "transmitting," "receiving," or "communicating," when referring to a network entity 105, may refer to any portion of a network entity 105 (for example, a base station 140, a CU 160, a DU 165, a RU 170) of a RAN communicating with another device (for example, directly or via other network entities 105).

The communication links 125 shown in the wireless communication system 100 may include downlink transmissions (for example, forward link transmissions) from a network entity 105 to a UE 115, uplink transmissions (for example, return link transmissions) from a UE 115 to a network entity 105, or both, among other configurations of transmissions. Carriers may carry downlink or uplink communication (for example, in an FDD mode) or may be configured to carry downlink and uplink communication (for example, in a TDD mode).

A carrier may be associated with a particular bandwidth of the RF spectrum and, in some examples, the carrier bandwidth may be referred to as a "system bandwidth" of the carrier or the wireless communication system 100. For example, the carrier bandwidth may be one of a set of bandwidths for carriers of a particular radio access technology (for example, 1.4, 3, 5, 10, 15, 20, 40, or 80 megahertz (MHz)). Devices of the wireless communication system 100 (for example, the network entities 105, the UEs 115, or both) may have hardware configurations that support communication using a particular carrier bandwidth or may be configurable to support communication using one of a set of carrier bandwidths. In some examples, the wireless communication system 100 may include network entities 105 or UEs 115 that support concurrent communication using carriers associated with multiple carrier bandwidths. In some examples, each served UE 115 may be configured for operating using portions (for example, a sub-band, a BWP) or all of a carrier bandwidth.

Signal waveforms transmitted via a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (for example, a duration of one modulation symbol) and one subcarrier, in which case the symbol period and subcarrier spacing may be inversely related. The quantity of bits carried by each resource element may depend on the modulation scheme (for example, the order of the modulation scheme, the coding rate of the modulation scheme, or both), such that a relatively higher quantity of resource elements (for example, in a transmission duration) and a relatively higher order of a modulation scheme may correspond to a relatively higher rate of communication. A wireless communication resource may refer to a combination of an RF spectrum resource, a time resource, and a spatial resource (for example, a spatial layer, a beam), and the use of multiple spatial resources may increase the data rate or data integrity for communication with a UE 115.

Numerologies for a carrier may be supported, and a numerology may include a subcarrier spacing ($\Delta f$) and a cyclic prefix. A carrier may be divided into BWPs having the same or different numerologies. In some examples, a UE 115 may be configured with multiple BWPs. In some examples, a single BWP for a carrier may be active at a given time and communication for the UE 115 may be restricted to active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communication resource may be organized according to radio frames each having a specified duration (for example, 10 milliseconds (ms)). Each radio frame may be identified by a system frame number (SFN) (for example, ranging from 0 to 1023).

Each frame may include multiple consecutively-numbered subframes or slots, and each subframe or slot may have the same duration. In some examples, a frame may be divided (for example, in the time domain) into subframes, and each subframe may be further divided into a quantity of slots. Alternatively, each frame may include a variable quantity of slots, and the quantity of slots may depend on subcarrier spacing. Each slot may include a quantity of symbol periods (for example, depending on the length of the cyclic prefix prepended to each symbol period). In some wireless communication systems 100, a slot may further be divided into multiple mini-slots associated with symbols. Excluding the cyclic prefix, each symbol period may be associated with (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communication system 100 and may be referred to as a transmission time interval (TTI). In some examples, the TTI duration (for example, a quantity of symbol periods in a TTI) may be variable. Additionally, or alternatively, the smallest scheduling unit of the wireless communication system 100 may be dynamically selected (for example, in bursts of shortened TTIs (STTIs)).

Physical channels may be multiplexed for communication using a carrier according to various techniques. A physical control channel and a physical data channel may be multiplexed for signaling via a downlink carrier, for example, using of time division multiplexing (TDM) techniques, frequency division multiplexing (FDM) techniques, or hybrid TDM-FDM techniques. A control region (for example, a CORESET) for a physical control channel may be defined by a set of symbol periods and may extend across the system bandwidth or a subset of the system bandwidth of the carrier. Control regions (for example, CORESETs) may be configured for a set of the UEs 115. For example, the UEs 115 may monitor or search control regions for control information according to search space sets, and each search space set may include one or multiple control channel candidates in aggregation levels arranged in a cascaded manner. An aggregation level for a control channel candidate may refer to an amount of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (for example, a base station 140, an RU 170) may be movable and provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communication system 100 may include, for example, a heterogeneous network in which different types of the network entities 105 provide coverage for various coverage areas 110 using the same or different radio access technologies.

The wireless communication system 100 may support synchronous or asynchronous operation. For synchronous operation, network entities 105 (for example, base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

The wireless communication system 100 may be configured to support ultra-reliable communication or low-latency communication, or various combinations thereof. For example, the wireless communication system 100 may be configured to support ultra-reliable low-latency communication (URLLC). The UEs 115 may be designed to support ultra-reliable, low-latency, or critical functions. Ultra-reliable communication may include private communication or group communication and may be supported by services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (for example, in accordance with a peer-to-peer (P2P), D2D, or sidelink protocol). In some examples, UEs 115 of a group that are performing D2D communication may be within the coverage area 110 of a network entity 105 (for example, a base station 140, an RU 170), which may support aspects of such D2D communication being configured by (for example, scheduled by) the network entity 105. In some examples, the UEs 115 of such a group may be outside the coverage area 110 of a network entity 105 or may be otherwise unable to or not configured to receive transmissions from a network entity 105. In some examples, groups of the UEs 115 communicating via D2D communication may support a one-to-many (1:M) system in which each UE 115 transmits to each of the other UEs 115 in the group. In some examples, a network entity 105 may facilitate the scheduling of resources for D2D communication. In some other examples, D2D communication may be carried out between the UEs 115 without an involvement of a network entity 105.

The core network 130 may provide user authentication, access authorization, tracking. Internet Protocol (IP) connectivity, and other access, routing, or mobility functions. The core network 130 may be an evolved packet core (EPC) or 5G core (5GC), which may include a control plane entity that manages access and mobility (for example, a mobility management entity (MME), an access and mobility management function (AMF)) and a user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (for example, base stations 140) associated with the core network 130. User IP packets may be transferred through the user plane entity, which may provide IP address allocation as well as other functions. The user plane entity may be connected to IP services 150 for network operators. The IP services 150 may include access to the Internet, Intranet(s), an IP Multimedia Subsystem (IMS), or a Packet-Switched Streaming Service.

The wireless communication system 100 may operate using frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communication using UHF waves may be associated with smaller antennas and shorter ranges (for example, less than 100 kilometers) with respect to communication using the smaller frequencies and longer waves of the high frequency (HF) or very high frequency (VHF) portion of the spectrum below 300 MHz.

The wireless communication system 100 may also operate using a super high frequency (SHF) region, which may be in the range of 3 GHz to 30 GHZ, also known as the centimeter band, or using an extremely high frequency (EHF) region of the spectrum (for example, from 30 GHz to 300 GHz), also known as the millimeter band. In some examples, the wireless communication system 100 may support millimeter wave (mmW) communication between the UEs 115 and the network entities 105 (for example, base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use different frequency regions, and designated use of bands across these frequency regions may differ by country or regulating body.

The wireless communication system 100 may utilize both licensed and unlicensed RF spectrum bands. For example, the wireless communication system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be in accordance with a carrier aggregation configuration in conjunction with component carriers operating using a licensed band (for example, LAA). Operations using unlicensed spectrum may include downlink transmissions, uplink transmissions, P2P transmissions, or D2D transmissions, among other examples.

A network entity 105 (for example, a base station 140, an RU 170) or a UE 115 may be equipped with multiple antennas, which may be used to employ techniques such as transmit diversity, receive diversity, multiple-input multiple-output (MIMO) communication, or beamforming. The antennas of a network entity 105 or a UE 115 may be located within antenna arrays or antenna panels, which may support MIMO operations or transmit or receive beamforming. For example, base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communication with a UE 115. Likewise, a UE 115 may include antenna arrays that may support various MIMO or beamforming operations. Additionally, or alternatively, an antenna panel may support RF beamforming for a signal transmitted via an antenna port.

The network entities 105 or the UEs 115 may use MIMO communication to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (for example, the same codeword) or different data streams (for example, different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (for example, a network entity 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A network entity 105 or a UE 115 may use beam sweeping techniques as part of beamforming operations. For example, a network entity 105 (for example, a base station 140, an RU 170) may use multiple antennas or antenna arrays (for example, antenna panels) to conduct beamforming operations for directional communication with a UE 115. Some signals (for example, synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (for example, by a transmitting device, such as a network entity 105, or by a receiving device, such as a UE 115) a beam direction for later transmission or reception by the network entity 105.

Some signals, such as data signals associated with a particular receiving device, may be transmitted by transmitting device (for example, a transmitting network entity 105, a transmitting UE 115) along a single beam direction (for example, a direction associated with the receiving device, such as a receiving network entity 105 or a receiving UE 115). In some examples, the beam direction associated with transmissions along a single beam direction may be determined in accordance with a signal that was transmitted along beam directions. For example, a UE 115 may receive the signals transmitted by the network entity 105 along different directions and may report to the network entity 105 an indication of the signal that the UE 115 received with a highest signal quality or an otherwise acceptable signal quality.

In some examples, transmissions by a device (for example, by a network entity 105 or a UE 115) may be performed using multiple beam directions, and the device may use a combination of digital precoding or beamforming to generate a combined beam for transmission (for example, from a network entity 105 to a UE 115). The UE 115 may report feedback that indicates precoding weights for beam directions, and the feedback may correspond to a configured set of beams across a system bandwidth or sub-bands. The network entity 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted along directions by a network entity 105 (for example, a base station 140, an RU 170), a UE 115 may employ similar techniques for transmitting signals multiple times along different directions (for example, for identifying a beam direction for subsequent transmission or reception by the UE 115) or for transmitting a signal along a single direction (for example, for transmitting data to a receiving device).

A receiving device (for example, a UE 115) may perform reception operations in accordance with multiple receive configurations (for example, directional listening) when receiving various signals from a receiving device (for example, a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned along a beam direction determined in accordance with listening to different receive configuration directions (for example, a beam direction determined to have a highest signal strength, highest signal-to-noise ratio (SNR), or otherwise acceptable signal quality in accordance with listening according to multiple beam directions).

The wireless communication system 100 may be a packet-based network that operates according to a layered protocol stack. In the user plane, communication at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In some cases, a UE 115 may communicate with a network entity via multiple TRPs within an mTRP operation. The multiple TRPs may transmit multiple DCIs to the UE 115 via multiple PDCCHs to schedule multiple PDSCHs (for example, mDCI based mTRP). In some cases, a first TRP may schedule a first PDSCH for transmission via the first TRP and a second TRP may schedule a second PDSCH for transmission via the second TRP, and the first PDSCH and the second PDSCH may overlap in the time and/or frequency. For overlapping PDSCHs, the UE 115 may perform joint demodulation. To initialize joint demodulation, the UE 115 may decode a first PDCCH transmitted from the first TRP and a second PDCCH transmitted from the second TRP, in which the first PDCCH includes a DCI that schedules the first PDSCH and the second PDCCH includes a DCI that schedules the second PDSCH. In examples in which the PDCCHs are aligned in time, such that the PDCCHs are in the same PDCCH monitoring occasion and the UE 115 receives the PDCCHs at the same or approximately the same time (for example, time-aligned), the UE 115 may initiate joint demodulation of the PDSCHs without delay. In examples in which the PDCCHs are not aligned in time (for example, time-misaligned) and transmitted in different monitoring occasions, then the UE 115 may wait to decode second PDCCH, causing delay for demodulation of the PDSCHs.

To reduce or prevent delay in decoding of the PDCCHs, so that that the UE 115 may perform joint demodulation of the PDSCHs, a UE 115 may indicate a capability of receiving downlink control channels (for example, PDCCHs) that partially or fully overlap in time and schedule downlink shared channels (for example, PDSCHs) that partially or fully overlap in time. The UE 115 may receive a first DCI over a first downlink control channel from the first TRP and a second DCI over a second downlink control channel from the second TRP. The first downlink control channel may overlap in time with the second downlink control channel. To facilitate joint demodulation and decoding of the PDSCHs, the UE 115 may be capable of time-aligned PDCCH reception for scheduling of overlapped PDSCHs in an mDCI and mTRP operation. The aligned PDCCH reception may include a completely aligned PDCCH reception, a span-aligned PDCCH reception, or a partial-span-aligned PDCCH reception, as described herein. The UE 115 may receive a first PDCCH from the first TRP via a first search space set and a second PDCCH from the second TRP via a second search space set. The first search space set may be associated with a first CORESET and the second search space set is associated with a second CORSET.

Figure 2:
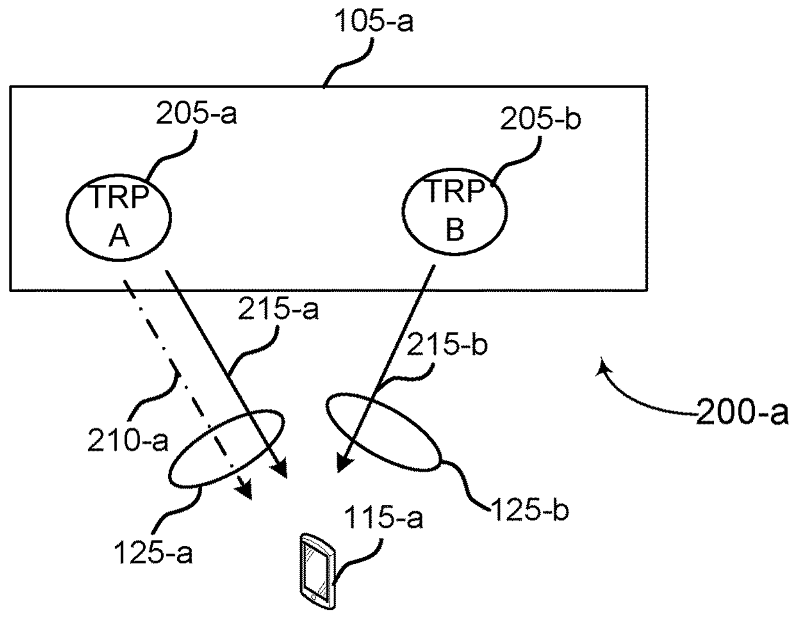
FIG. 2 shows an example of a wireless communication system that supports aligned downlink control channel reception in mDCI mTRP scenarios in accordance with aspects of the present disclosure.
Figure 2:
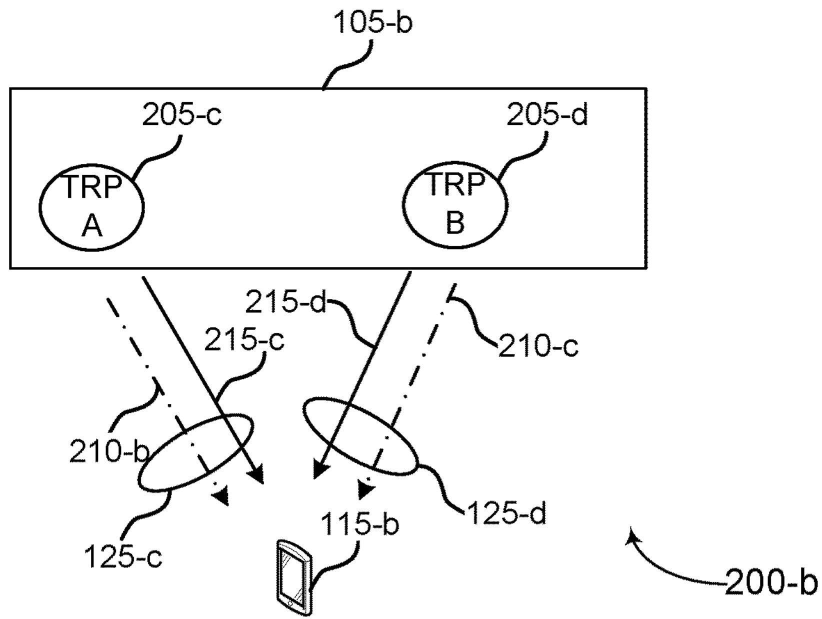

FIG. 2 shows an example of a wireless communication system 200 that supports aligned downlink control channel reception in mDCI mTRP scenarios in accordance with aspects of the present disclosure The wireless communication system 200 may implement aspects of or may be implemented by aspects of the wireless communication system 100. For example, the wireless communication system 200 includes a UE 115-*a* and a UE 115-*b*, which may be examples of a UE 115 described with reference to FIG. 1. The wireless communication system 200 includes a network entity 105-*a* and a network entity 105-*b*, which may be examples of a network entity 105 as described with reference to FIG. 1. The wireless communication system 200 also includes a TRP 205-*a*, a TRP 205-*b*, a TRP 205-*c*, and a TRP 205-*d*. For example, the network entity 105-*a* may include the TRP 205-*a* and the TRP 205-*b*, and the network entity 105-*b* may include the TRP 205-*c* and the TRP 205-*d*.

The UE 115-*a* may communicate with TRP 205-*a* using a communication link 125-*a* between the UE 115-*a* and the TRP 205-*a*. The UE 115-*a* may communicate with the TRP 205-*b* using a communication link 125-*b* between the UE 115-*a* and the TRP 205-*b*. The UE 115-*a* may communicate with the TRP 205-*c* using a communication link 125-*c* between the UE 115-*a* and the TRP 205-*c*. The UE 115-*a* may communicate with the TRP 205-*d* using a communication link 125-*d* between the UE 115-*a* and the TRP 205-*d*. The communication link 125-*a*, the communication link 125-*b*, the communication link 125-*c*, and the communication link 125-*d* may be an example of an NR or LTE link. The communication link 125-*a*, the communication link 125-*b*, the communication link 125-*c*, and the communication link 125-*d* may include bi-directional links that enable both uplink and downlink communication. For example, the UEs 115 may transmit uplink signals (for example, uplink transmissions), such as uplink control signals or uplink data signals, to the TRPs 205 using the communication links 125. The TRPs 205 may transmit downlink signals (for example, downlink transmissions), such as downlink control signals or downlink data signals, to the UEs 115 using the communication links 125.

In a first wireless communication system 200-*a*, the mTRP operation may include a single-DCI based mTRP operation. In the single-DCI based mTRP operation, the TRP 205-*a* may transmit a PDCCH 210-*a* to the UE 115-*a*. A single DCI may be transmitted over the single PDCCH. The single DCI may be used to schedule aa single PDSCH transmitted via both TRP 205-*a* and TRP 205-*b* . . . . The first PDSCH 215-*a* may be used to communicate a first set of layers of the PDSCH between the TRP 205-*a* and UE 115-*a* and the second PDSCH 215-*b* may be used to communicate a second set of layers of the PDSCH between the TRP 205-*b* and UE 115-*a*. In some examples, the single-DCI based mTRP may be used for ideal backhaul communication in which the TRP 205-*a* and the TRP 205-*b* may communicate with each other.

In a second wireless communication system 200-*b*, the mTRP operation may include an mDCI based mTRP. In the second wireless communication system 200-*b*, TRP 205-*c* may transmit a PDCCH 210-*b* to the UE 115-*b* and the TRP 205-*d* may transmit a PDCCH 210-*c* to the UE 115-*a*. Each of the PDCCHs may include DCIs that schedule respective PDSCHs, including the PDSCH 215-*c* and the PDSCH 215-*d*. In some examples, the mDCI based mTRP may be used for non-ideal or ideal backhaul communication, in which the TRP 205-*a* and the TRP 205-*b* may communicate with each other. In some examples, a carrier aggregation framework may be used to apply different TRPs 205 as different virtual component carriers from a UE-capability perspective of the UE 115-*b*. In some cases, the PDSCHs of the mDCI-based mTRP may overlap in time and/or frequency. In some examples, the TRP 205-*c* and the TRP 205-*d* may share MAC, RLC, or PDCP, but may each have different quasi co-location (QCL) properties. For example, from the perspective of the UE, the TRP 205-*c* may be associated with a first transmission configuration indicator (TCI) state and the TRP 205-*d* may be associated with a second TCI state.

Figure 3:
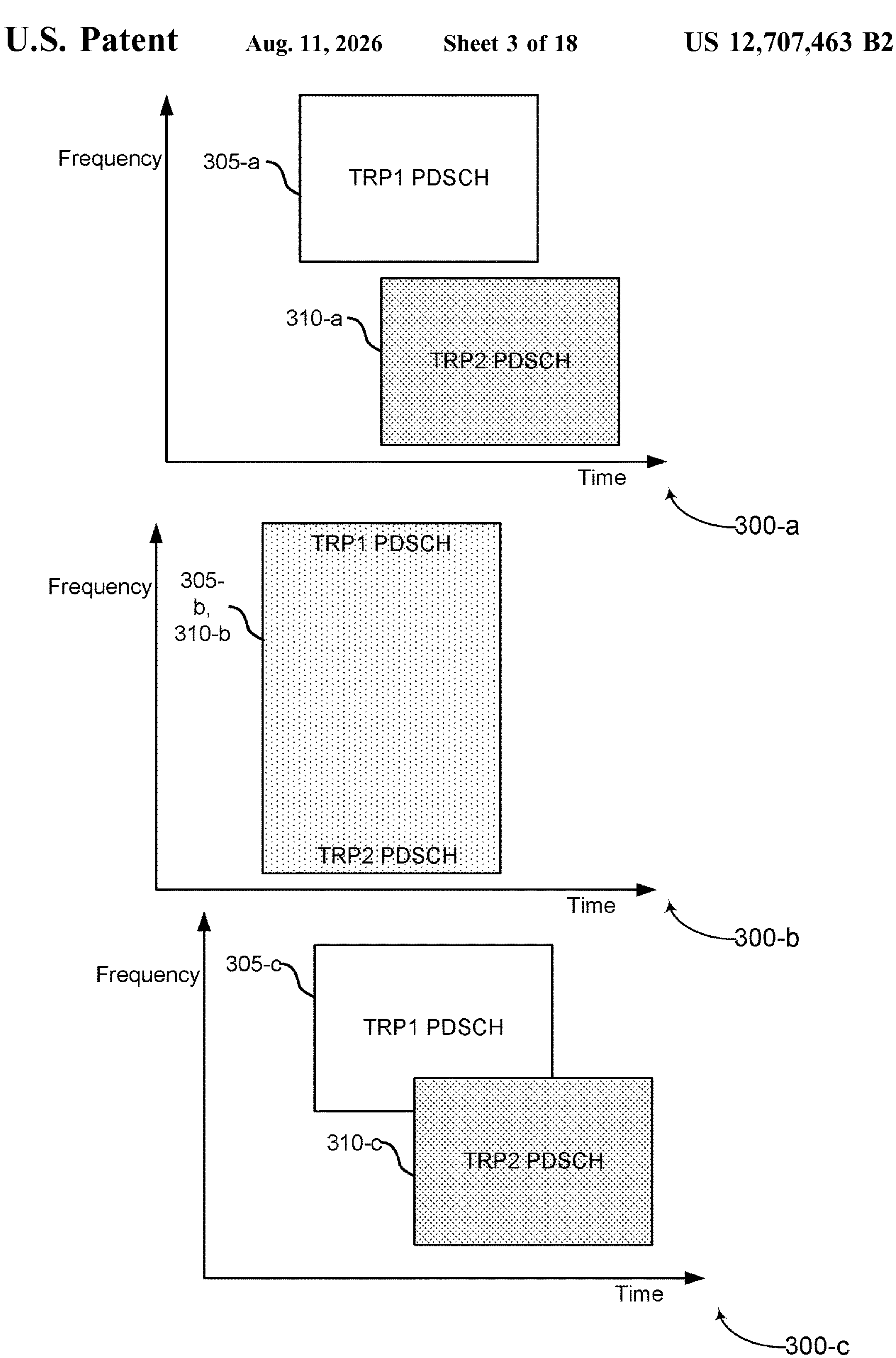
FIG. 3 shows an example of mDCI mTRP physical downlink shared channel (PDSCH) scheduling that supports aligned downlink control channel reception in mDCI mTRP scenarios in accordance with aspects of the present disclosure.

FIG. 3 shows an example of mDCI mTRP PDSCH scheduling 300 that supports aligned downlink control channel reception in mDCI mTRP scenarios in accordance with aspects of the present disclosure. In the mDCI mTRP scenarios, a first TRP may transmit a first PDSCH and a second TRP may transmit a second PDSCH, and the first PDSCH and the second PDSCH may overlap in the time and/or frequency domain. In a first mDCI mTRP PDSCH scheduling 300-*a*, a first PDSCH 305-*a* (TRP1 PDSCH) from the first TRP and a second PDSCH 310-*a* (TRP2 PDSCH) from the second TRP may partially overlap in time, but may not overlap in frequency. In some examples, the first PDSCH 305-*a* and the second PDSCH 310-*a* may fully overlap in time, but may not overlap in frequency.

In a second mDCI mTRP PDSCH scheduling 300-*b*, a first PDSCH 305-*b* (TRP1 PDSCH) and a second PDSCH 310-*b* (TRP2 PDSCH) may fully overlap in time, as well as in frequency. In a third mDCI mTRP PDSCH scheduling 300-*c*, a first PDSCH 305-*c* (TRP1 PDSCH) and a second PDSCH 310-*c* (TRP2 PDSCH) partially overlap in time and partially overlap in frequency. In some examples, the first PDSCH 305-*c* and the second PDSCH 310-*c* may fully overlap in time (for example, partially or fully overlap in time and partially overlap in frequency. The UE 115 may perform joint demodulation and decoding of the multiple PDSCHs.

Figure 4:
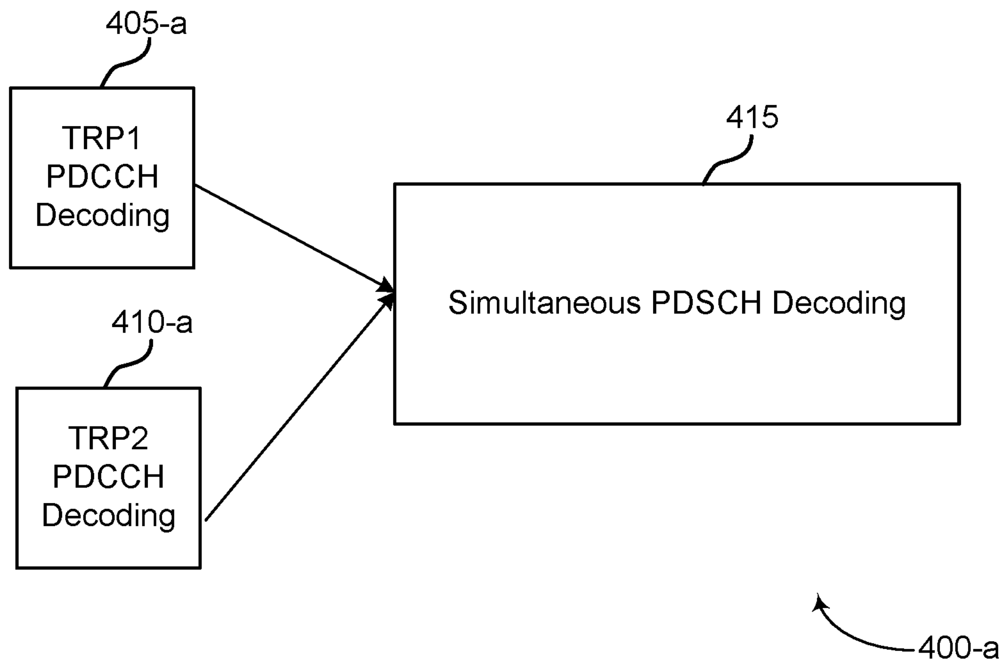
FIG. 4 shows an example of joint demodulation that supports aligned downlink control channel reception in mDCI mTRP scenarios in accordance with aspects of the present disclosure.
Figure 4:
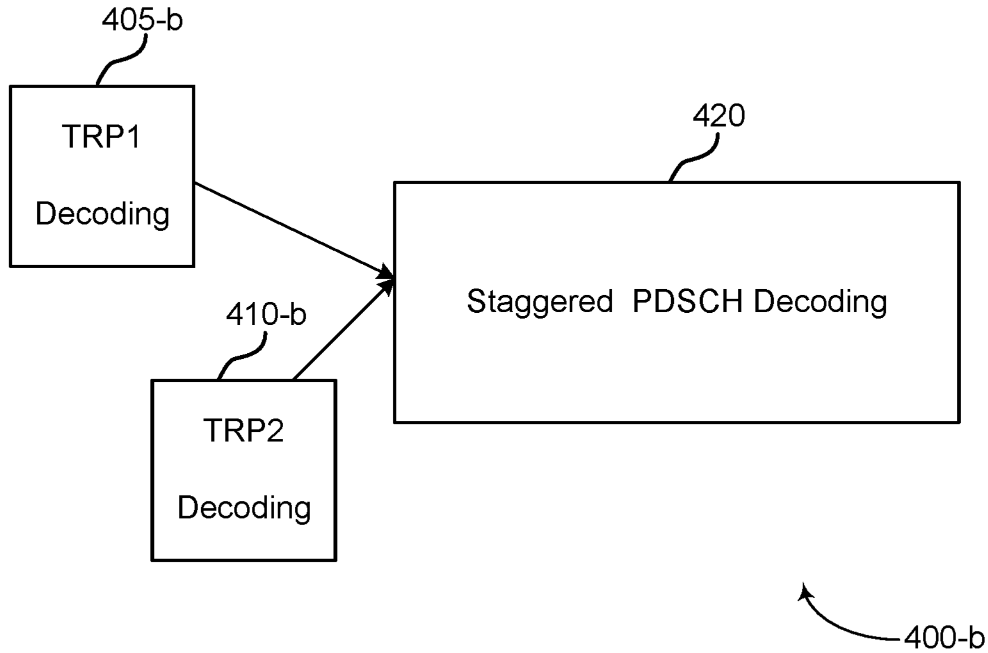

FIG. 4 shows an example of joint demodulation 400 that supports aligned downlink control channel reception in mDCI mTRP scenarios in accordance with aspects of the present disclosure. For overlapped PDSCHs, joint demodulation may provide better performance at a UE 115 or for communication between the UE 115 and the respective TRPs. To initiate joint demodulation, the UE 115 may decode the two PDCCHs (for example, the PDCCHs as described with reference to FIG. 2) from the first TRP (TRP1) and the second TRP (TRP2).

A first demodulation scenario 400-*a* may include reception of a PDCCH from the first TRP (PDCCH 405-*a*) and a PDCCH from the second TRP (PDCCH 410-*a*) in the same monitoring occasion. Decoding of the PDCCH 405-*a* (TRP1 decoding) and the PDCCH 410-*a* may be time-aligned to occur at the same time, such that joint demodulation 415 of the PDSCHs scheduled by the PDCCH 405-*a* and the PDCCH 410-*a* may be initiated without delay. For example, in examples in which the PDCCH 405-*a* and the PDCCH 410-*a* are transmitted from the TRPs in the same PDCCH monitoring occasion, the UE 115 may initiate the joint demodulation 415 without delay.

A second demodulation scenario 400-*b* may include reception of a PDCCH from the first TRP (PDCCH 405-*b*) and a PDCCH from the second TRP (PDCCH 410-*b*) in different or misaligned monitoring occasions. Decoding of the PDCCH 405-*b* (TRP1 decoding) and the PDCCH 410-*b* (TRP2 decoding) may be time-misaligned to occur at different times, such that the joint demodulation 415 of the PDSCHs scheduled by the PDCCH 405-*a* and the PDCCH 410-*a* may include a delay. For example, in examples in which the PDCCHs are transmitted in different PDCCH monitoring occasions, the UE 115 may wait to decode the second PDCCH, causing delay for demodulating the PDSCHs. For example, the PDCCH decoding may be staggered and result in a staggered PDCCH decoding 420. In the staggered PDCCH decoding, the UE 115 may decode the first arriving PDCCH and the UE 115 may decode the second arriving PDCCH afterwards in a staggered manner. As a result, the joint PDSCH demodulation may also occur a staggered manner.

In some examples, the PDSCH scheduling from the first TRP and the second TRP may not be coordinated. The UE 115 may perform a single PDSCH decoding or two overlapped PDSCH decoding for the uncoordinated PDSCH scheduling, resulting in delayed decoding or demodulation of the PDSCHs (as a result of the uncoordinated and time-misaligned PDCCH decoding).

Figure 5:
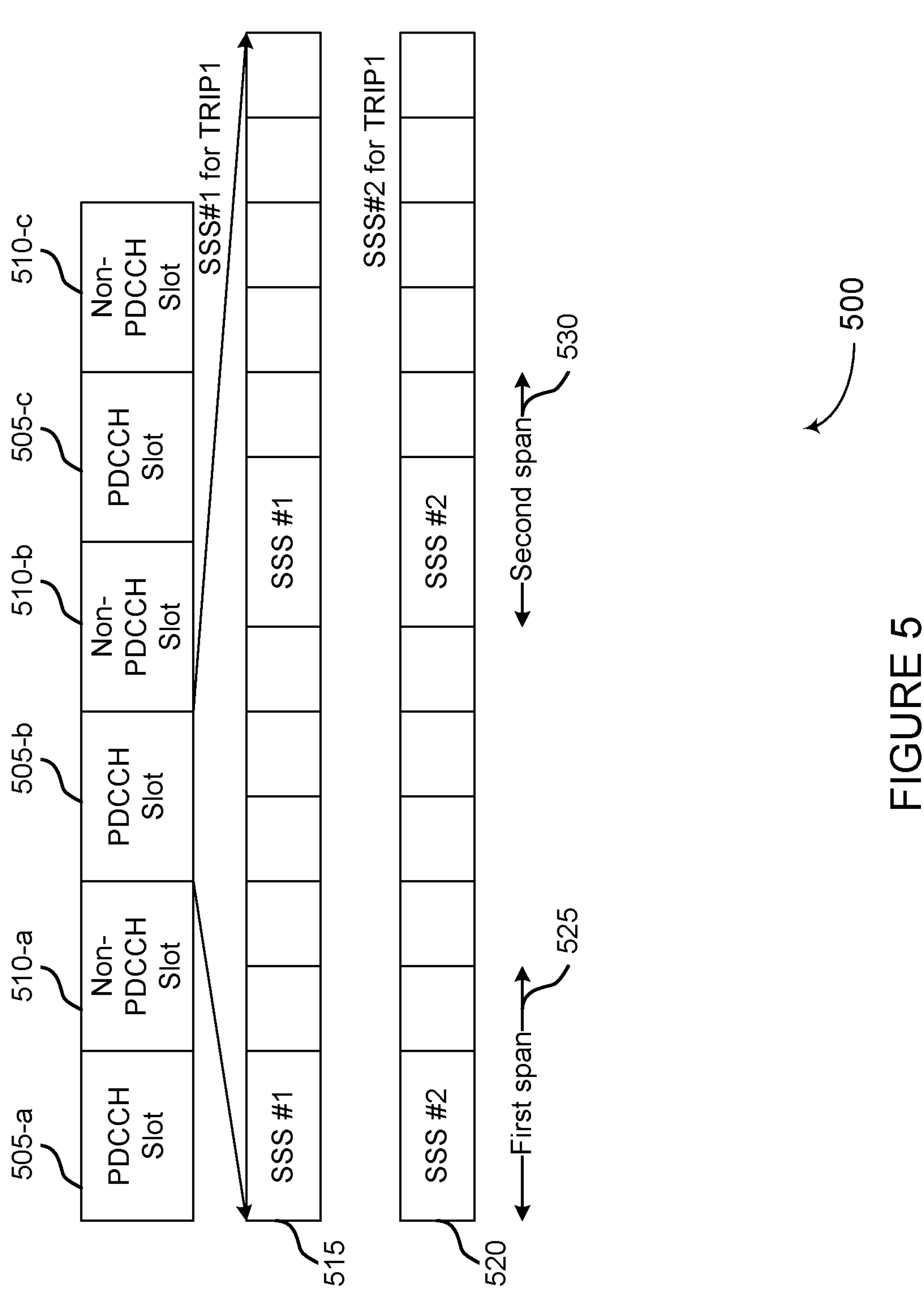
FIG. 5 shows an example of a completely aligned physical downlink control channel (PDCCH) reception in mDCI mTRP scenarios in accordance with aspects of the present disclosure.

FIG. 5 shows an example of a completely aligned PDCCH reception 500 in mDCI mTRP scenarios in accordance with aspects of the present disclosure.

To reduce or prevent delayed decoding and demodulation for the PDSCHs, a UE 115 may indicate a capability for time-aligned PDCCH reception for scheduling of overlapped PDSCHs in mDCI mTRP operation. The aligned PDCCH reception may occur for the PDSCHs that are fully overlapping in time and frequency, as described with reference to the mDCI mTRP PDSCH scheduling 300-*b* of FIG. 3. The aligned PDCCH reception may include completely aligned PDCCH reception, span-aligned PDCCH reception, or partial-span-aligned PDCCH reception. In some examples, the UE 115 with an aligned PDCCH reception capability may not expect to receive misaligned PDCCHs scheduling for overlapped PDSCHs.

The first TRP may transmit PDCCHs to the UE 115 over PDCCHs slots 505, such as a first PDCCH slot 505-*a*, a second PDCCH slot 505-*b*, and a third PDCCH slot 505-*c*.

The TRP may transmit non-PDCCH-related data over non-PDCCH slots 510, such as a first non-PDCCH slot 510-*a*, a second non-PDCCH slot 510-*b*, and a third non-PDCCH slot 510-*c*.

The UE 115 may receive first PDCCH from the first TRP via a first search space set 515 (SSS #1) and the second PDCCH from the second TRP via a second search space set 520 (SSS #2) in a first span 525 or a second span 530. The first search space set 515 may be associated with a first CORESET and the second search space set 520 may be associated with a second CORSET. In the completely aligned PDCCH reception 500, the first search space set 515 and the second search space set 520 may completely overlap in time. For example, the first span 525 includes both the first search space set 515 and the second search space set 520. In some examples, the first search space set 515 and the second search space set 520 completely align in time. The second span 530 also includes both the first search space set 515 and the second search space set 520. In some examples, the first search space set 515 and the second search space set 520 completely align in time.

The first TRP and the second TRP may transmit the respective first and second PDCCHs to the UE 115 over the second PDCCH slot 505-*b*. The UE 115 may receive the first PDCCH from the first TRP via the first search space set 515 and the second PDCCH from the second TRP via the second search space set 520.

In the completely aligned PDCCH reception 500, the CORESET duration may be the same for two CORESETs associated with SSS #1 and SSS #2. The first search space set 515 and the second search space set 520 have a same slot periodicity and slot offset and a same monitoring symbol within each slot. The first search space set 515 and the second search space set 520 in the same monitoring symbol may be associated with a same time offset, K0, for scheduling the PDSCHs (for example, the K0 values are the same for time-domain resource allocations (TDRAs) in the first and the second PDCCHs scheduling the first and the second PDSCHs in the same PDCCH monitoring occasion.

Figure 6:
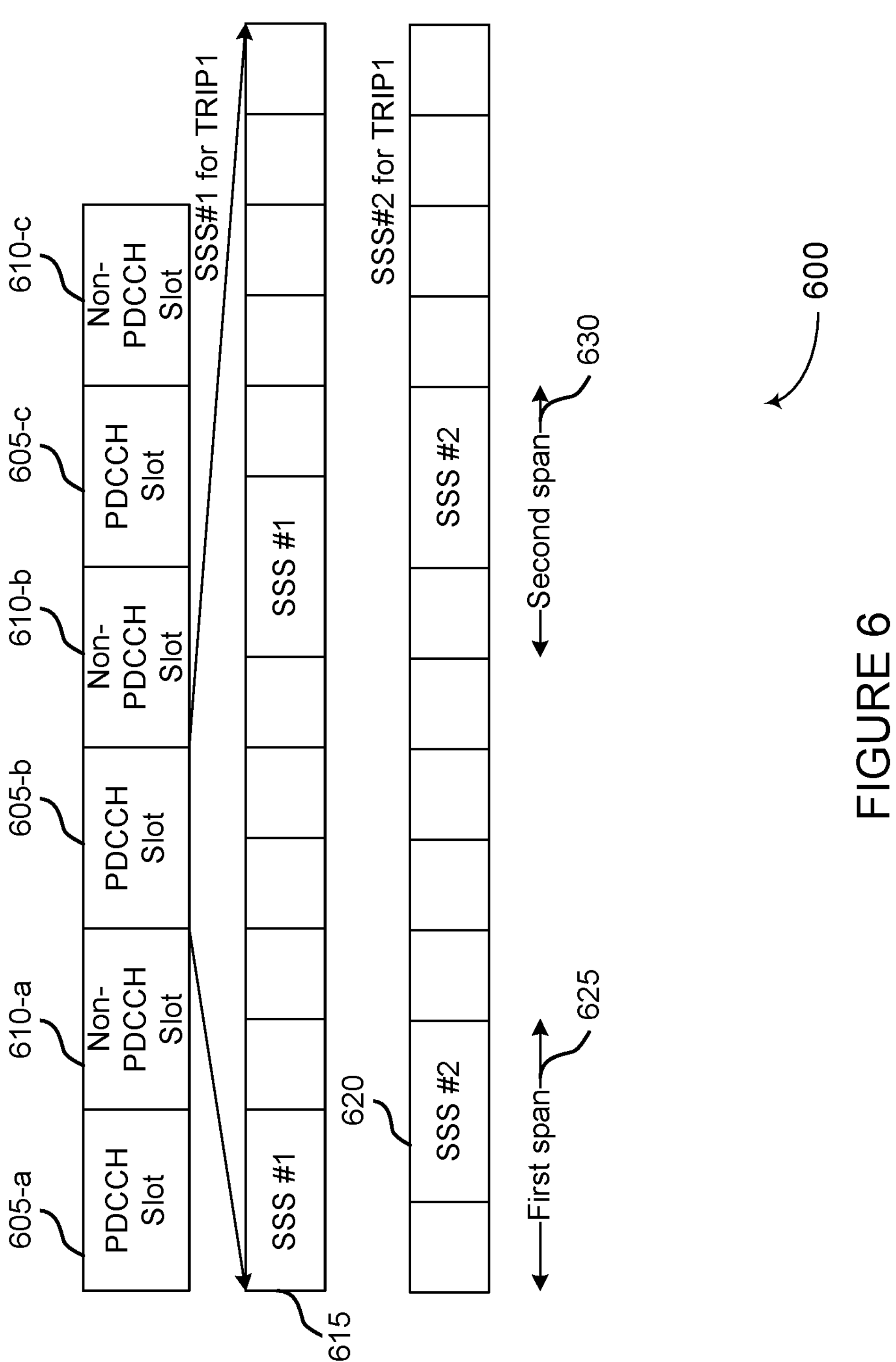
FIG. 6 shows an example of a span-aligned PDCCH reception in mDCI mTRP scenarios in accordance with aspects of the present disclosure.

FIG. 6 shows an example of a span-aligned PDCCH reception 600 in mDCI mTRP scenarios in accordance with aspects of the present disclosure.

The aligned PDCCH reception may occur for the PDSCHs are that are fully overlapping in time and frequency, as described with reference to the mDCI mTRP PDSCH scheduling 300-*b* of FIG. 3. In some examples, the UE 115 with an aligned PDCCH reception capability may not expect to receive misaligned PDCCHs scheduling overlapped PDSCHs.

In the span-aligned PDCCH reception 600, the first TRP may transmit PDCCHs to the UE 115 over PDCCHs slots 605, such as a first PDCCH slot 605-*a*, a second PDCCH slot 605-*b*, and a third PDCCH slot 605-*c*. The TRP may transmit non-PDCCH-related data over non-PDCCH slots 610, such as a first non-PDCCH slot 610-*a*, a second non-PDCCH slot 610-*b*, and a third non-PDCCH slot 610-*c*.

The UE 115 may receive the first PDCCH from the first TRP via a first search space set 615 (SSS #1) and the second PDCCH from the second TRP via a second search space set 620 (SSS #2) in a first span 625 or a second span 630. The first search space set 615 may be associated with a first control resource set CORSET and the second search space set 620 may be associated with a second CORSET. In the span-aligned PDCCH reception 600, the first search space set 615 and the second search space set 620 may partially overlap in time. However, the first span 625 and the second span 630 may be aligned. For example, the first span 625 includes both the first search space set 615 and the second search space set 620, and the second span 630 also includes both the first search space set 615 and the second search space set 620.

The first TRP and the second TRP may transmit the respective first and second PDCCHs to the UE 115 over the second PDCCH slot 605-*b*. The UE 115 may receive the first PDCCH from the first TRP via the first search space set 615 and the second PDCCH from the second TRP via the second search space set 620.

In the span-aligned PDCCH reception 600, the duration for the two CORESETs may be different. The first search space set 615 and the second search space set 620 may have a same slot periodicity and slot offset and a same PDCCH monitoring occasion. The first search space set 615 and the second search space set 620 in the same PDCCH monitoring occasion may be associated with a same time offset, K0, for scheduling the PDSCHs (for example, the K0 values are same for TDRAs in the two PDCCHs scheduling PDSCHs in the same PDCCH monitoring occasion). In some examples, the last orthogonal frequency division multiplexing (OFDM) symbol of the two DCIs from the two PDCCHs may not differ by more than X symbols in a slot (X=0, 1.2).

Figure 7:
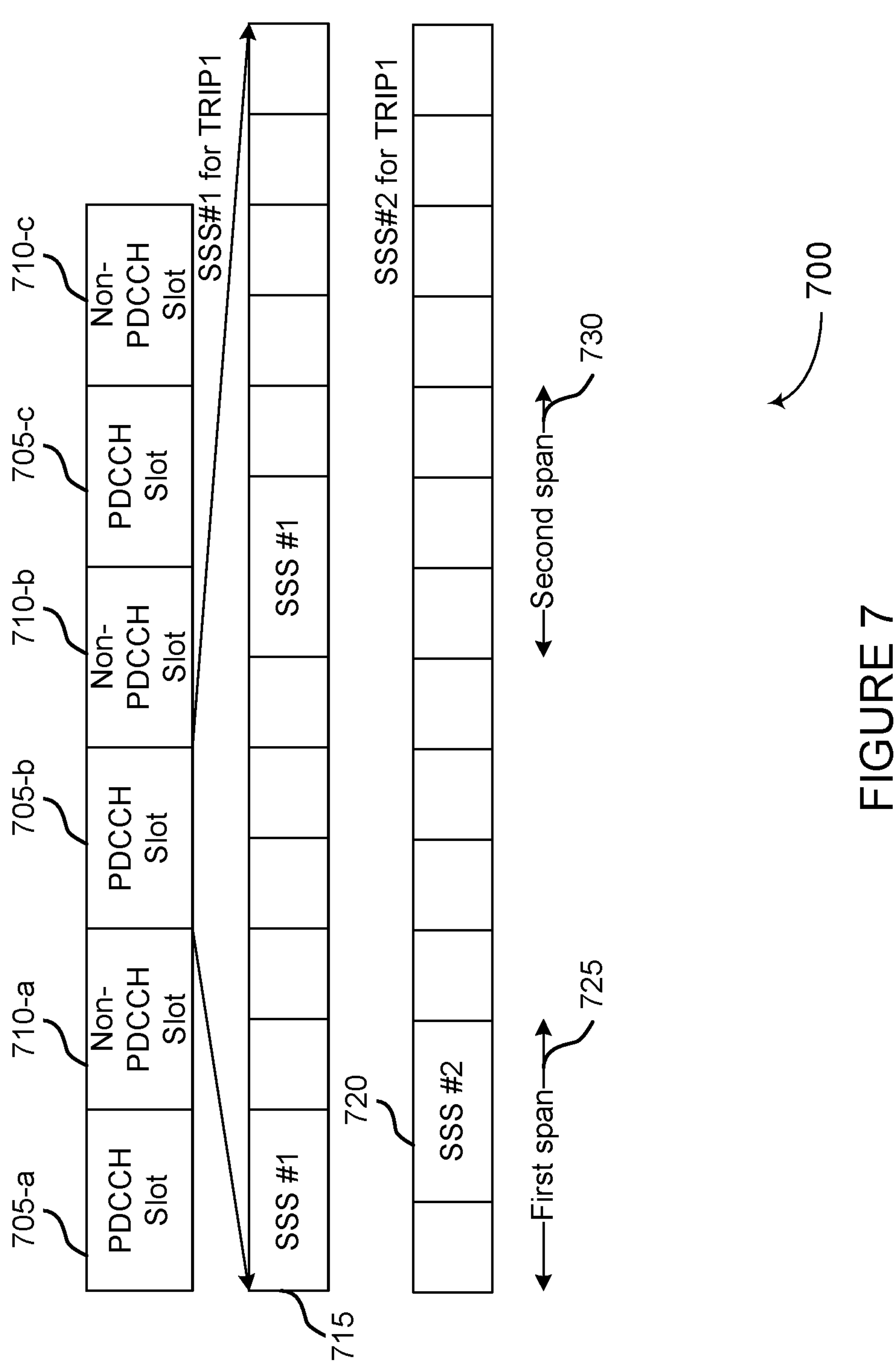
FIG. 7 shows an example of a partial-span-aligned PDCCH reception in mDCI mTRP scenarios in accordance with aspects of the present disclosure.

FIG. 7 shows an example of a partial-span-aligned PDCCH reception 700 in mDCI mTRP scenarios in accordance with aspects of the present disclosure.

The aligned PDCCH reception may occur for the PDSCHs are that are fully overlapping in time and frequency, as described with reference to the mDCI mTRP PDSCH scheduling 300-*b* of FIG. 3. In some examples, the UE 115 with an aligned PDCCH reception capability may not expect to receive misaligned PDCCHs scheduling for overlapped PDSCHs.

In the partial-span-aligned PDCCH reception 700, the first TRP may transmit PDCCHs to the UE 115 over PDCCHs slots 705, such as a first PDCCH slot 705-*a*, a second PDCCH slot 705-*b*, and a third PDCCH slot 705-*c*. The TRP may transmit non-PDCCH-related data over non-PDCCH slots 710, such as a first non-PDCCH slot 710-*a*, a second non-PDCCH slot 710-*b*, and a third non-PDCCH slot 710-*c*.

The UE 115 may receive the first PDCCH from the first TRP via a first search space set 715 (SSS #1 for TRP1) and the second PDCCH from the second TRP via a second search space set 720 (SSS #2 for TRP2) in a first span 725 or a second span 730. The first search space set 715 may be associated with a first control resource set CORSET and the second search space set 720 may be associated with a second CORSET.

In the partial-span-aligned PDCCH reception 700, the first search space set 715 and the second search space set 720 may partially overlap in time, and the first span and 725 and the second span 730 may be partially aligned. For example, the first span 725 may include both the first search space set 715 and the second search space set 720 and the second span 730 may include just the first search space set 715. In some examples, one span (for example, the first span 725) may include both the first search space set 715 and the second search space set 720 and the other span (for example, the second span 730) may include just the second search space set 720.

The first TRP and the second TRP may transmit the respective first and second PDCCHs to the UE 115 over the second PDCCH slot 705-*b*. The UE 115 may receive the first PDCCH from the first TRP via the first search space set 715 and the second PDCCH from the second TRP via the second search space set 720.

In the partial-span-aligned PDCCH reception 700, the duration for the two CORESETs may be different. The first search space set 715 and the second search space set 720 may have different slot periodicity and a different monitoring symbol within each slot. The first search space set 715 and the second search space set 720 in the same span may be associated with a same time offset, K0, for scheduling the PDSCHs (for example, the K0 values are same for TDRAs in the two PDCCHs scheduling PDSCHs in the same PDCCH monitoring occasion).

Figure 8:
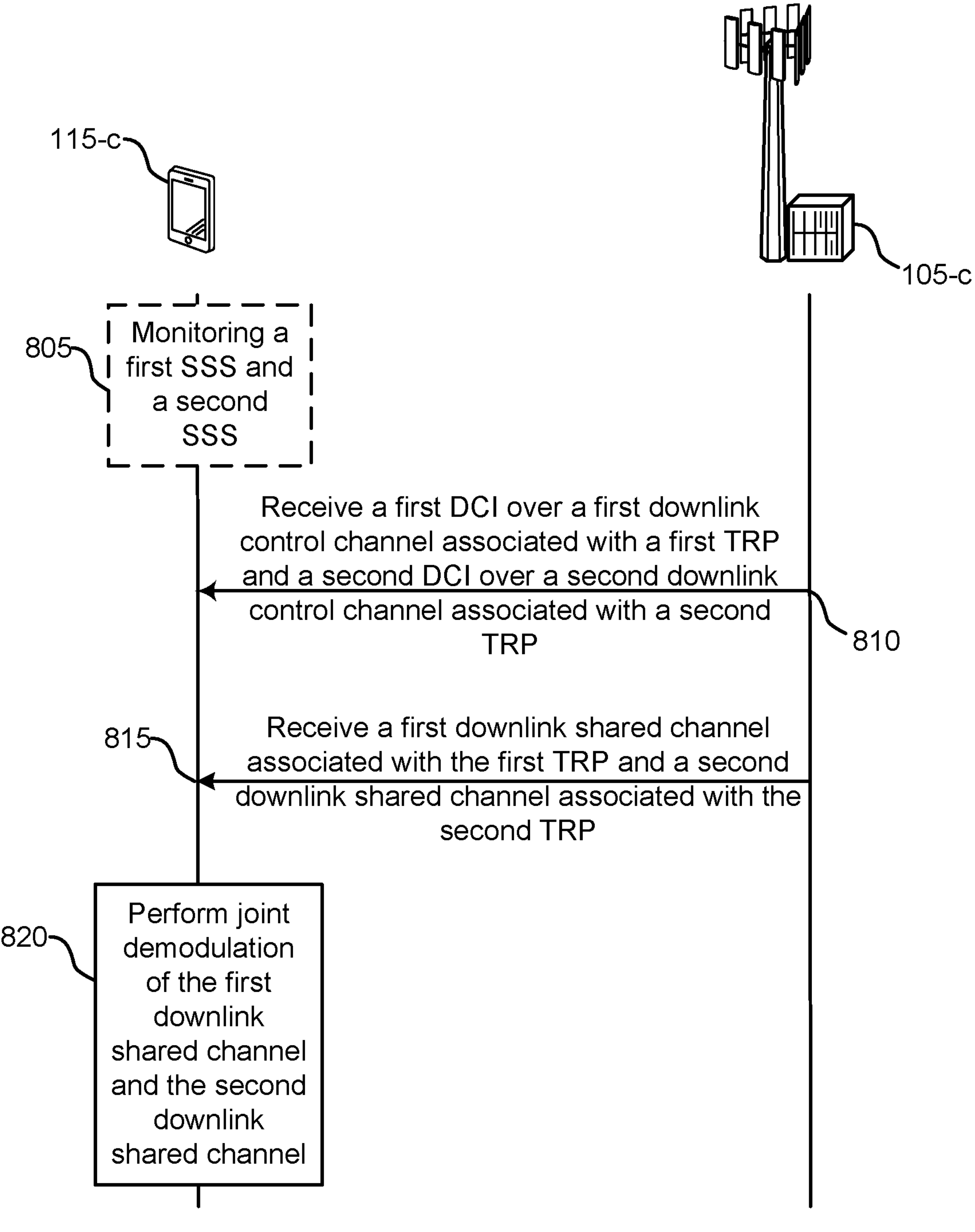
FIG. 8 shows an example of a process flow that supports aligned downlink control channel reception in mDCI mTRP scenarios in accordance with aspects of the present disclosure.

FIG. 8 shows an example of a process flow 800 that supports aligned downlink control channel reception in mDCI mTRP scenarios in accordance with aspects of the present disclosure. The process flow 800 may include UE 115-*c*, which may be an example of UE 115, as described herein. The process flow 800 may also include a network entity 105-*c*, which may be an example of network entity 105, as described herein. In the following description of the process flow 800, the operations between the network entity 105-*c* and the UE 115-*c* may be transmitted in a different order than the example order shown, or the operations may be performed in different orders or at different times. Some operations may also be omitted from the process flow 800, and other operations may be added to the process flow 800. In some examples, the network entity 105-*c* may be or include TRPs.

In some examples, at 805, the UE 115-*c* may monitor a first search space set for a first downlink control channel, such as a first PDCCH, and a second search space set for a second downlink control channel (for example, a second PDCCH). In some examples, the first search space set and the second search space set may completely align in time (for example, completely aligned reception). In such examples, the first search space set may be associated with a first CORSET having a same duration as a second CORSET associated with the second search space set, in which the first search space set and the second search space set have a same slot periodicity and slot offset and a same monitoring symbol within each slot. The first search space set and the second search space set may be associated with a same time offset.

In some examples, the monitored first search space set and the second search space set may be span-aligned (for example, span-aligned reception). In such examples, the first search space set is associated with a first CORSET having a different duration than a second CORSET associated with the second search space set, in which the first search space set and the second search space set may have a same slot periodicity and slot offset. In some examples, each slot of the first search space set and each slot of the second search space set may include a single monitoring symbol in a same downlink control channel monitoring occasion.

In some examples, the monitored first search space set and the second search space set may be partial-span-aligned (for example, partial-span-aligned reception). In such examples, the first search space set may be associated with a first CORSET having a different duration than a second CORSET associated with the second search space set. The first search space set and the second search space set may have a different slot periodicity. In some examples, the monitoring symbol of the first search space set may at least partially overlap in time with the monitoring symbol of the second search space set.

At 810, the UE 115-*c* may receive a first DCI over a first downlink control channel associated with a first TRP of the network entity 105-*c* and a second DCI associated with a second TRP of the network entity 105-*c*. For example, the network entity 105-*c* may transmit the first downlink control channel via the first TRP and may transmit the second downlink control channel via the second TRP. In some examples, such as for the span-aligned mDCI mTRP scenario, a last OFDM symbol of the first DCI may be within a threshold symbol quantity of a last OFDM symbol of the second DCI. At 815, the UE 115-*c* may receive a first downlink shared channel (for example, a first PDSCH) associated with the first TRP and a second downlink shared channel (for example, a second PDSCH) associated with the second TRP. For example, the network entity 105-*c* may transmit the first downlink shared channel via the first TRP and may transmit the second downlink shared channel via the second TRP. In some examples, the first downlink shared channel and the second downlink shared channel may partially overlap in frequency.

In some examples, the UE 115 may receive the first downlink shared channel via a first set of frequency resources and the second downlink shared channel via a second set of frequency resources different than the first set of frequency resources. The first set of frequency resources and the second set of frequency resources may partially or fully overlap in frequency.

At 820, the UE 115 may perform joint demodulation of the first downlink shared channel and the second downlink shared channel. In some examples, the UE 115 may transmit, to a network entity associated with the first TRP and the second TRP, signaling indicative of the capability of the UE. For example, because the UE 115 may be capable of aligned reception, such as by completely aligned reception, span-aligned reception, or partial-span-aligned reception, the UE 115 may perform joint demodulation in which the first and second PDSCHs are demodulated at the same time, reducing delay otherwise associated with disjointed PDCCH reception and decoding.

Figure 9:
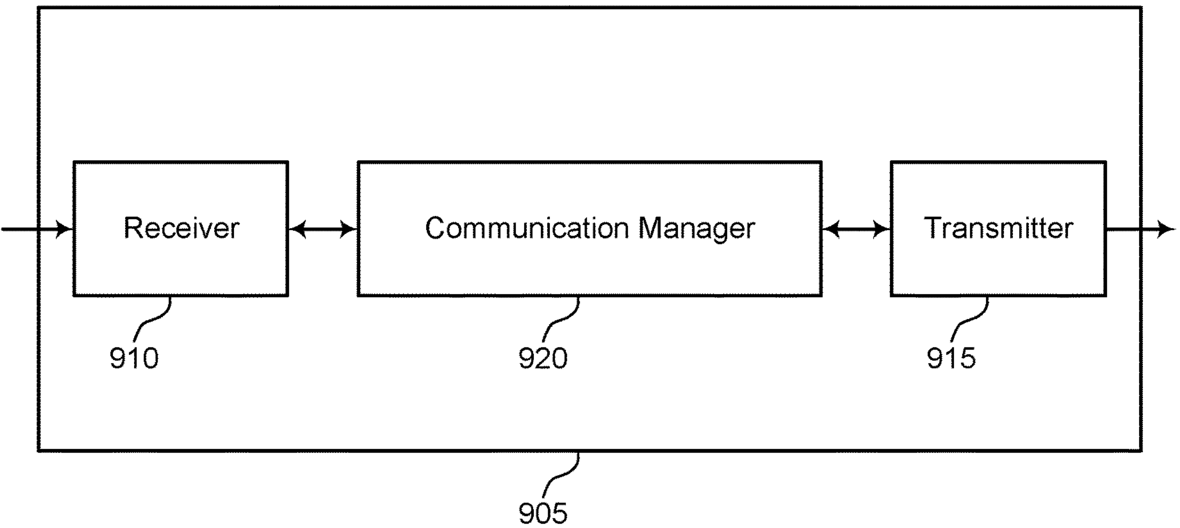
FIGS. 9 and 10 show devices that support aligned downlink control channel reception in mDCI mTRP scenarios in accordance with aspects of the present disclosure.

FIG. 9 shows a device 905 that supports aligned downlink control channel reception in mDCI mTRP scenarios in accordance with aspects of the present disclosure. The device 905 may be an example of aspects of a UE 115 as described herein. The device 905 may include a receiver 910, a transmitter 915, and a communication manager 920. The communication manager 920 can be implemented, at least in part, by one or both of a modem and a processor. Each of these components may be in communication with one another (for example, via buses).

The receiver 910 may provide a means for receiving information such as packets, user data, control information, or any combination thereof associated with various information channels (for example, control channels, data channels, information channels related to aligned downlink control channel reception in mDCI mTRP scenarios). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (for example, control channels, data channels, information channels related to aligned downlink control channel reception in mDCI mTRP scenarios). In some examples, the transmitter 915 may be co-located with a receiver 910 in a transceiver component. The transmitter 915 may utilize a single antenna or a set of multiple antennas.

The communication manager 920, the receiver 910, the transmitter 915, or various combinations thereof or various components thereof may be examples of means for performing various aspects of aligned downlink control channel reception in mDCI mTRP scenarios as described herein. For example, the communication manager 920, the receiver 910, the transmitter 915, or various combinations or components thereof may support a method for performing the functions described herein.

In some examples, the communication manager 920, the receiver 910, the transmitter 915, or various combinations or components thereof may be implemented in hardware (for example, in communication management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform the functions described herein (for example, by executing, by the processor, instructions stored in the memory).

Additionally, or alternatively, in some examples, the communication manager 920, the receiver 910, the transmitter 915, or various combinations or components thereof may be implemented in code (for example, as communication management software or firmware) executed by a processor. If implemented in code executed by a processor, the functions of the communication manager 920, the receiver 910, the transmitter 915, or various combinations or components thereof may be performed by a general-purpose processor, a DSP, a CPU, an ASIC, an FPGA, a microcontroller, or any combination of these or other programmable logic devices (for example, configured as or otherwise supporting a means for performing the functions described in the present disclosure).

In some examples, the communication manager 920 may be configured to perform various operations (for example, receiving, obtaining, monitoring, outputting, transmitting) using or otherwise in cooperation with the receiver 910, the transmitter 915, or both. For example, the communication manager 920 may receive information from the receiver 910, send information to the transmitter 915, or be integrated in combination with the receiver 910, the transmitter 915, or both to obtain information, output information, or perform various other operations as described herein.

The communication manager 920 may support wireless communication at a UE in accordance with examples as disclosed herein. For example, the communication manager 920 is capable of, configured to, or operable to support a means for receiving, in accordance with a capability of the UE to receive downlink control channels that at least partially overlap in time and that are associated with scheduling downlink shared channels that at least partially overlap in time, first downlink control information over a first downlink control channel associated with a first transmission and reception point, and second downlink control information over a second downlink control channel associated with a second transmission and reception point, the first downlink control channel at least partially overlapping in time with the second downlink control channel, the first downlink control information scheduling a first downlink shared channel associated with the first transmission and reception point, and the second downlink control information scheduling a second downlink shared channel associated with the second transmission and reception point. The communication manager 920 is capable of, configured to, or operable to support a means for receiving the first downlink shared channel associated with the first transmission and reception point in accordance with the first downlink control information and the second downlink shared channel associated with the second transmission and reception point in accordance with the second downlink control information, the first downlink shared channel at least partially overlapping with the second downlink shared channel in time. The communication manager 920 is capable of, configured to, or operable to support a means for performing joint demodulation of the first downlink shared channel and the second downlink shared channel.

By including or configuring the communication manager 920 in accordance with examples as described herein, the device 905 (for example, a processor controlling or otherwise coupled with the receiver 910, the transmitter 915, the communication manager 920, or a combination thereof) may support techniques for reducing or preventing a delayed decoding and demodulation of PDSCHs, facilitating joint demodulation of PDSCHs and more efficient performance at the UE 115 or the network entity 105.

Figure 10:
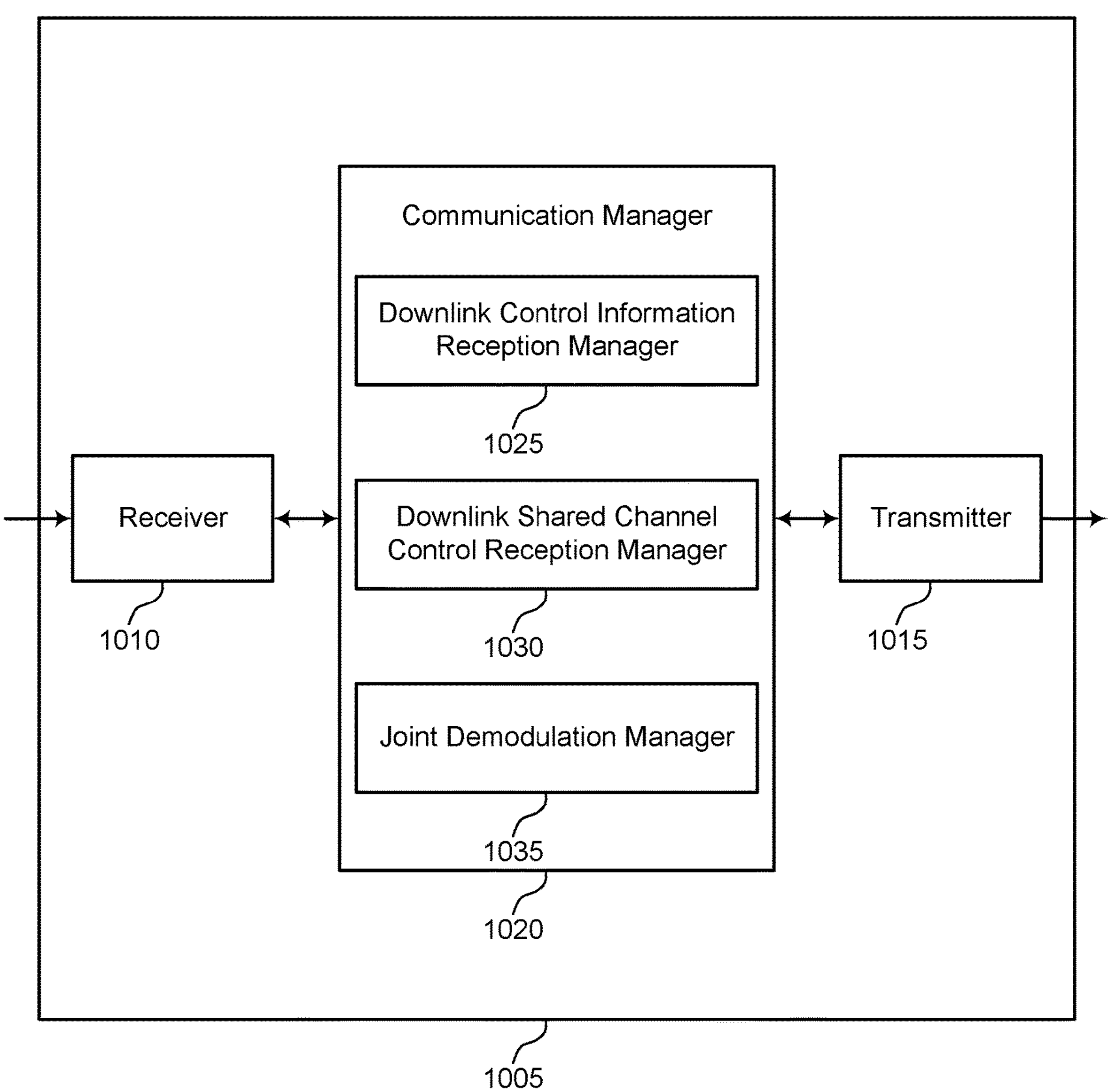

FIG. 10 shows a device 1005 that supports aligned downlink control channel reception in mDCI mTRP scenarios in accordance with aspects of the present disclosure. The device 1005 may be an example of aspects of a device 905 or a UE 115 as described herein. The device 1005 may include a receiver 1010, a transmitter 1015, and a communication manager 1020. The communication manager 1020 can be implemented, at least in part, by one or both of a modem and a processor. Each of these components may be in communication with one another (for example, via buses).

The receiver 1010 may provide a means for receiving information such as packets, user data, control information, or any combination thereof associated with various information channels (for example, control channels, data channels, information channels related to aligned downlink control channel reception in mDCI mTRP scenarios). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (for example, control channels, data channels, information channels related to aligned downlink control channel reception in mDCI mTRP scenarios). In some examples, the transmitter 1015 may be co-located with a receiver 1010 in a transceiver component. The transmitter 1015 may utilize a single antenna or a set of multiple antennas.

The device 1005, or various components thereof, may be an example of means for performing various aspects of aligned downlink control channel reception in mDCI mTRP scenarios as described herein. For example, the communication manager 1020 may include a downlink control information reception manager 1025, a downlink shared channel control reception manager 1030, a joint demodulation manager 1035, or any combination thereof. In some examples, the communication manager 1020, or various components thereof, may be configured to perform various operations (for example, receiving, obtaining, monitoring, outputting, transmitting) using or otherwise in cooperation with the receiver 1010, the transmitter 1015, or both. For example, the communication manager 1020 may receive information from the receiver 1010, send information to the transmitter 1015, or be integrated in combination with the receiver 1010, the transmitter 1015, or both to obtain information, output information, or perform various other operations as described herein.

The communication manager 1020 may support wireless communication at a UE in accordance with examples as disclosed herein. The downlink control information reception manager 1025 is capable of, configured to, or operable to support a means for receiving, in accordance with a capability of the UE to receive downlink control channels that at least partially overlap in time and that are associated with scheduling downlink shared channels that at least partially overlap in time, first downlink control information over a first downlink control channel associated with a first transmission and reception point, and second downlink control information over a second downlink control channel associated with a second transmission and reception point, the first downlink control channel at least partially overlapping in time with the second downlink control channel, the first downlink control information scheduling a first downlink shared channel associated with the first transmission and reception point, and the second downlink control information scheduling a second downlink shared channel associated with the second transmission and reception point. The downlink shared channel control reception manager 1030 is capable of, configured to, or operable to support a means for receiving the first downlink shared channel associated with the first transmission and reception point in accordance with the first downlink control information and the second downlink shared channel associated with the second transmission and reception point in accordance with the second downlink control information, the first downlink shared channel at least partially overlapping with the second downlink shared channel in time. The joint demodulation manager 1035 is capable of, configured to, or operable to support a means for performing joint demodulation of the first downlink shared channel and the second downlink shared channel.

Figure 11:
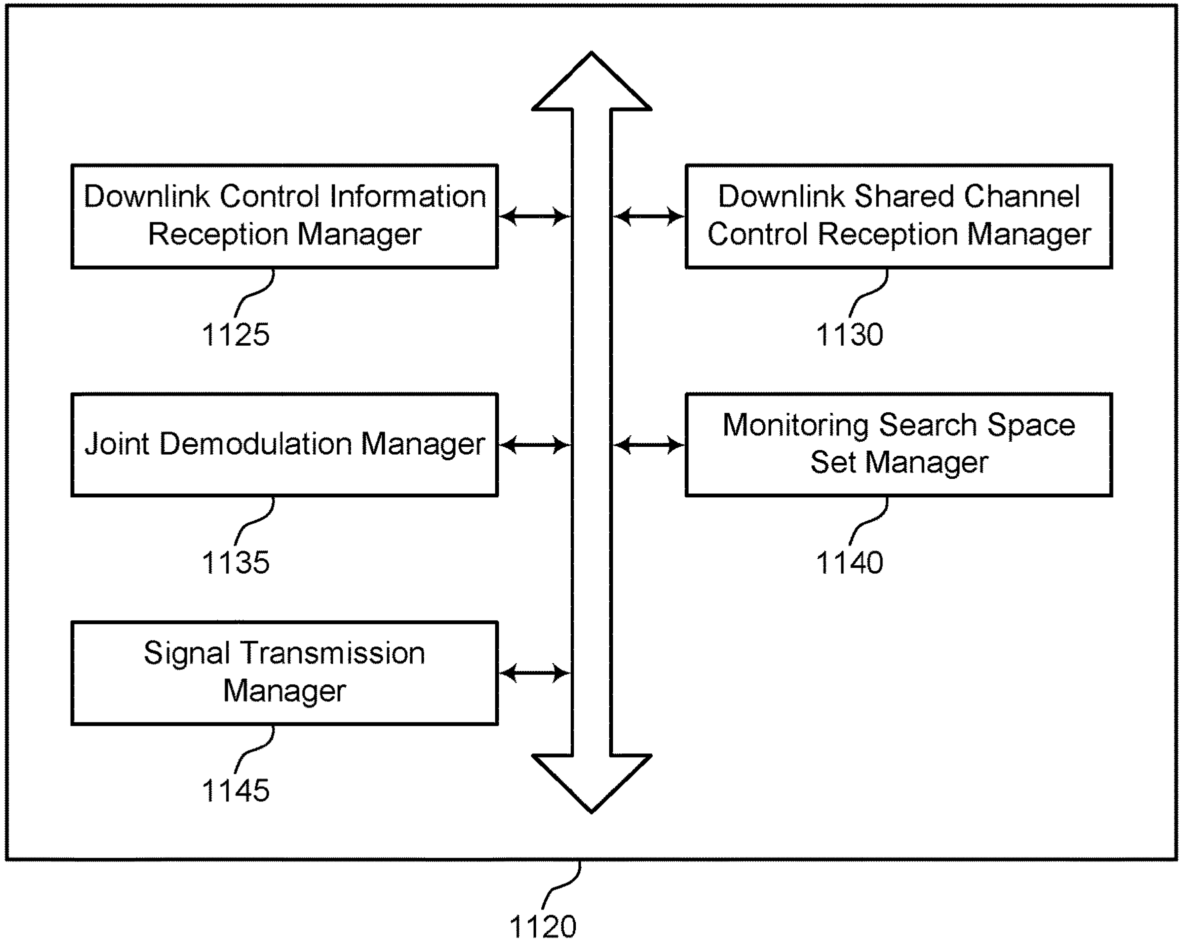
FIG. 11 shows a communication manager that supports aligned downlink control channel reception in mDCI mTRP scenarios in accordance with aspects of the present disclosure.

FIG. 11 shows a communication manager 1120 that supports aligned downlink control channel reception in mDCI mTRP scenarios in accordance with aspects of the present disclosure. The communication manager 1120, or various components thereof, may be an example of means for performing various aspects of aligned downlink control channel reception in mDCI mTRP scenarios as described herein. For example, the communication manager 1120 may include a downlink control information reception manager 1125, a downlink shared channel control reception manager 1130, a joint demodulation manager 1135, a monitoring search space set manager 1140, a signal transmission manager 1145, or any combination thereof. Each of these components may communicate, directly or indirectly, with one another (for example, via buses).

The communication manager 1120 may support wireless communication at a UE in accordance with examples as disclosed herein. The downlink control information reception manager 1125 is capable of, configured to, or operable to support a means for receiving, in accordance with a capability of the UE to receive downlink control channels that at least partially overlap in time and are associated with scheduling downlink shared channels that at least partially overlap in time, first downlink control information over a first downlink control channel associated with a first transmission and reception point, and second downlink control information over a second downlink control channel associated with a second transmission and reception point, the first downlink control channel at least partially overlapping in time with the second downlink control channel, the first downlink control information scheduling a first downlink shared channel associated with the first transmission and reception point, and the second downlink control information scheduling a second downlink shared channel associated with the second transmission and reception point. The downlink shared channel control reception manager 1130 is capable of, configured to, or operable to support a means for receiving the first downlink shared channel associated with the first transmission and reception point in accordance with the first downlink control information and the second downlink shared channel associated with the second transmission and reception point in accordance with the second downlink control information, the first downlink shared channel at least partially overlapping with the second downlink shared channel in time. The joint demodulation manager 1135 is capable of, configured to, or operable to support a means for performing joint demodulation of the first downlink shared channel and the second downlink shared channel.

In some examples, to support receiving the first downlink control information and the second downlink control information, the monitoring search space set manager 1140 is capable of, configured to, or operable to support a means for monitoring a first search space set for the first downlink control channel and a second search space set for the second downlink control channel, in which the first search space set is associated with a first control resource set having a same duration as a second control resource set associated with the second search space set, in which the first search space set and the second search space set have a same slot periodicity and slot offset, in which the first search space set and the second search space set have a same monitoring symbol within each slot, and in which the first downlink control channel in the first search space set and the second downlink control channel in the second search space set schedule the first downlink shared channel and the second downlink shared channel associated with a same time offset.

In some examples, the first search space set and the second search space set completely align in time.

In some examples, to support receiving the first downlink control information and the second downlink control information, the monitoring search space set manager 1140 is capable of, configured to, or operable to support a means for monitoring a first search space set for the first downlink control channel and a second search space set for the second downlink control channel, in which the first search space set is associated with a first control resource set having a different duration than a second control resource set associated with the second search space set, in which the first search space set and the second search space set have a same slot periodicity and slot offset, and in which the first downlink control channel in the first search space set and the second downlink control channel in the second search space set schedule the first downlink shared channel and the second downlink shared channel associated with a same time offset.

In some examples, each slot of the first search space set and each slot of the second search space set includes a single monitoring symbol in a same downlink control channel monitoring occasion.

In some examples, to support receiving the first downlink control information and the second downlink control information, the monitoring search space set manager 1140 is capable of, configured to, or operable to support a means for monitoring a first search space set for the first downlink control channel and a second search space set for the second downlink control channel, in which the first search space set is associated with a first control resource set having a different duration than a second control resource set associated with the second search space set, in which the first search space set and the second search space set have a different slot periodicity, and in which the first downlink control channel in the first search space set and the second downlink control channel in the second search space set schedule the first downlink shared channel and the second downlink shared channel associated with a same time offset.

In some examples, a monitoring symbol of the first search space set at least partially overlaps in time with the monitoring symbol of the second search space set.

In some examples, a last orthogonal frequency division multiplexing symbol of the first downlink control information is within a threshold symbol quantity of a last orthogonal frequency division multiplexing symbol of the second downlink control information.

In some examples, the signal transmission manager 1145 is capable of, configured to, or operable to support a means for transmitting, to a network entity associated with the first transmission and reception point and the second transmission and reception point, signaling indicative of the capability of the UE.

In some examples, the first downlink shared channel and the second downlink shared channel completely align in time and frequency.

In some examples, the first downlink shared channel is received via a first set of frequency resources and the second downlink shared channel is received via a second set of frequency resources different than the first set of frequency resources, the first set of frequency resources and the second set of frequency resources partially or fully overlapping in frequency.

In some examples, the first downlink shared channel and the second downlink shared channel partially overlap in frequency.

Figure 12:
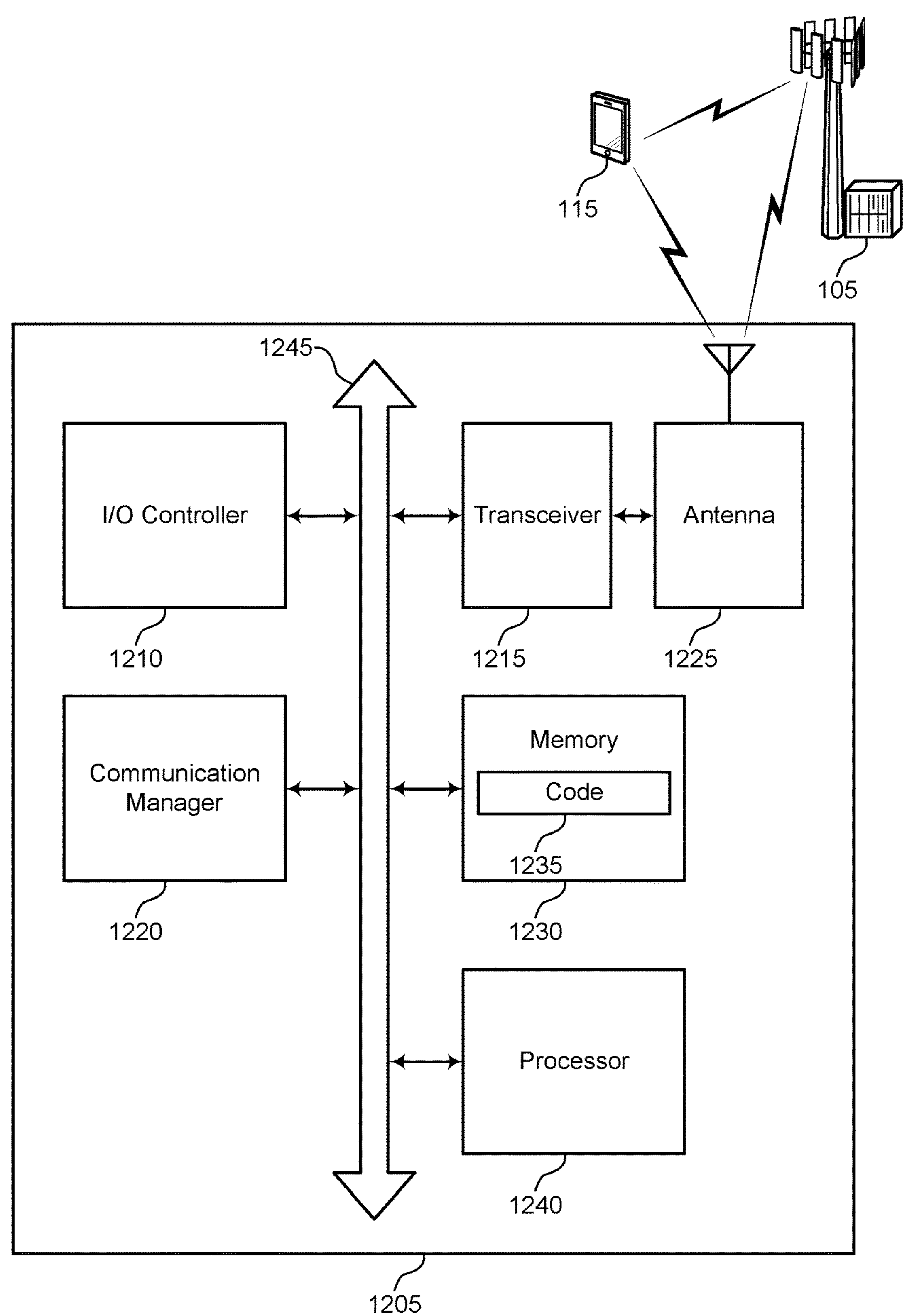
FIG. 12 shows a system including a device that supports aligned downlink control channel reception in mDCI mTRP scenarios in accordance with aspects of the present disclosure.

FIG. 12 shows a device 1205 that supports aligned downlink control channel reception in mDCI mTRP scenarios in accordance with aspects of the present disclosure. The device 1205 may be an example of or include the components of a device 905, a device 1005, or a UE 115 as described herein. The device 1205 may communicate (for example, wirelessly) with network entities 105, UEs 115, or any combination thereof. The device 1205 may include components for bi-directional voice and data communication including components for transmitting and receiving communication, such as a communication manager 1220, an input/output (I/O) controller 1210, a transceiver 1215, an antenna 1225, a memory 1230, code 1235, and a processor 1240. These components may be in electronic communication or otherwise coupled (for example, operatively, communicatively, functionally, electronically, electrically) via buses (for example, a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to antennas 1225 for transmission, and to demodulate packets received from the antennas 1225. The transceiver 1215, or the transceiver 1215 and antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (for example, when compiled and executed) to perform functions described herein. In some cases, the memory 1230 may contain, among other things, a basic I/O system (BIOS), which may control basic hardware or software operation such as the interaction with peripheral components or devices.

The processor 1240 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (for example, the memory 1230) to cause the device 1205 to perform various functions (for example, functions or tasks supporting aligned downlink control channel reception in mDCI mTRP scenarios). For example, the device 1205 or a component of the device 1205 may include a processor 1240 and memory 1230 coupled with or to the processor 1240, the processor 1240 and memory 1230 configured to perform various functions described herein.

The communication manager 1220 may support wireless communication at a UE in accordance with examples as disclosed herein. For example, the communication manager 1220 is capable of, configured to, or operable to support a means for receiving, in accordance with a capability of the UE to receive downlink control channels that at least partially overlap in time and that are associated with scheduling downlink shared channels that at least partially overlap in time, first downlink control information over a first downlink control channel associated with a first transmission and reception point, and second downlink control information over a second downlink control channel associated with a second transmission and reception point, the first downlink control channel at least partially overlapping in time with the second downlink control channel, the first downlink control information scheduling a first downlink shared channel associated with the first transmission and reception point, and the second downlink control information scheduling a second downlink shared channel associated with the second transmission and reception point. The communication manager 1220 is capable of, configured to, or operable to support a means for receiving the first downlink shared channel associated with the first transmission and reception point in accordance with the first downlink control information and the second downlink shared channel associated with the second transmission and reception point in accordance with the second downlink control information, the first downlink shared channel at least partially overlapping with the second downlink shared channel in time. The communication manager 1220 is capable of, configured to, or operable to support a means for performing joint demodulation of the first downlink shared channel and the second downlink shared channel.

By including or configuring the communication manager 1220 in accordance with examples as described herein, the device 1205 may support techniques for reducing or preventing a delayed decoding and demodulation of PDSCHs, facilitating joint demodulation of PDSCHs and more efficient performance at the UE 115 or the network entity 105.

In some examples, the communication manager 1220 may be configured to perform various operations (for example, receiving, monitoring, transmitting) using or otherwise in cooperation with the transceiver 1215, the antennas 1225, or any combination thereof. Although the communication manager 1220 is illustrated as a separate component, in some examples, functions described with reference to the communication manager 1220 may be supported by or performed by the processor 1240, the memory 1230, the code 1235, or any combination thereof. For example, the code 1235 may include instructions executable by the processor 1240 to cause the device 1205 to perform various aspects of aligned downlink control channel reception in mDCI mTRP scenarios as described herein, or the processor 1240 and the memory 1230 may be otherwise configured to perform or support such operations.

Figure 13:
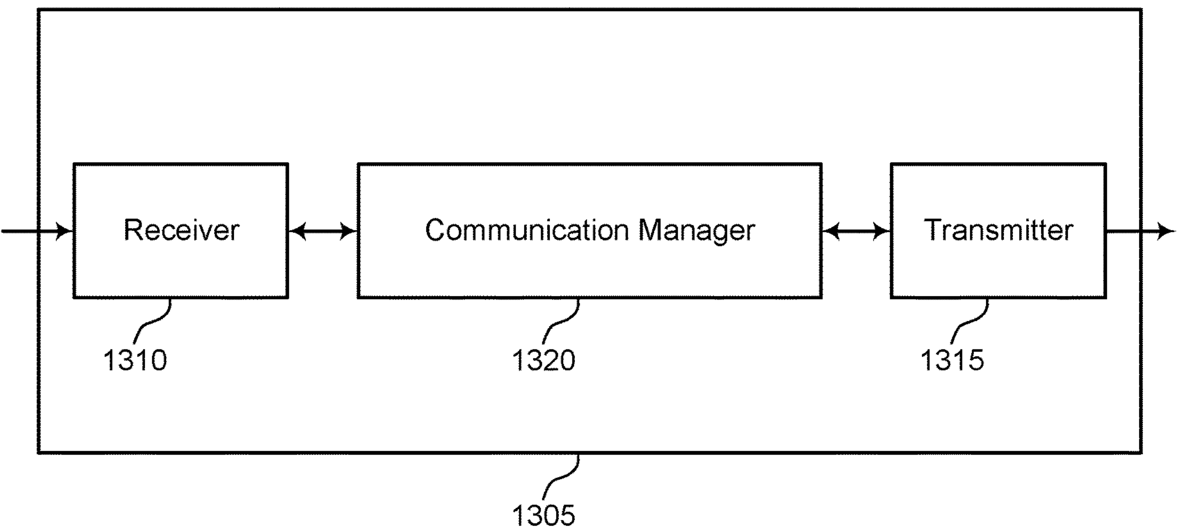
FIGS. 13 and 14 show devices that support aligned downlink control channel reception in mDCI mTRP scenarios in accordance with aspects of the present disclosure.

FIG. 13 shows a device 1305 that supports aligned downlink control channel reception in mDCI mTRP scenarios in accordance with aspects of the present disclosure. The device 1305 may be an example of aspects of a network entity 105 as described herein. The device 1305 may include a receiver 1310, a transmitter 1315, and a communication manager 1320. The communication manager 1320 can be implemented, at least in part, by one or both of a modem and a processor. Each of these components may be in communication with one another (for example, via buses).

The receiver 1310 may provide a means for obtaining (for example, receiving, determining, identifying) information such as user data, control information, or any combination thereof (for example, I/Q samples, symbols, packets, protocol data units, service data units) associated with various channels (for example, control channels, data channels, information channels, channels associated with a protocol stack). Information may be passed on to other components of the device 1305. In some examples, the receiver 1310 may support obtaining information by receiving signals via antennas. Additionally, or alternatively, the receiver 1310 may support obtaining information by receiving signals via wired (for example, electrical, fiber optic) interfaces, wireless interfaces, or any combination thereof.

The transmitter 1315 may provide a means for outputting (for example, transmitting, providing, conveying, sending) information generated by other components of the device 1305. For example, the transmitter 1315 may output information such as user data, control information, or any combination thereof (for example, I/Q samples, symbols, packets, protocol data units, service data units) associated with various channels (for example, control channels, data channels, information channels, channels associated with a protocol stack). In some examples, the transmitter 1315 may support outputting information by transmitting signals via antennas. Additionally, or alternatively, the transmitter 1315 may support outputting information by transmitting signals via wired (for example, electrical, fiber optic) interfaces, wireless interfaces, or any combination thereof. In some examples, the transmitter 1315 and the receiver 1310 may be co-located in a transceiver, which may include or be coupled with a modem.

The communication manager 1320, the receiver 1310, the transmitter 1315, or various combinations thereof or various components thereof may be examples of means for performing various aspects of aligned downlink control channel reception in mDCI mTRP scenarios as described herein. For example, the communication manager 1320, the receiver 1310, the transmitter 1315, or various combinations or components thereof may support a method for performing the functions described herein.

In some examples, the communication manager 1320, the receiver 1310, the transmitter 1315, or various combinations or components thereof may be implemented in hardware (for example, in communication management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform the functions described herein (for example, by executing, by the processor, instructions stored in the memory).

Additionally, or alternatively, in some examples, the communication manager 1320, the receiver 1310, the transmitter 1315, or various combinations or components thereof may be implemented in code (for example, as communication management software or firmware) executed by a processor. If implemented in code executed by a processor, the functions of the communication manager 1320, the receiver 1310, the transmitter 1315, or various combinations or components thereof may be performed by a general-purpose processor, a DSP, a CPU, an ASIC, an FPGA, a microcontroller, or any combination of these or other programmable logic devices (for example, configured as or otherwise supporting a means for performing the functions described in the present disclosure).

In some examples, the communication manager 1320 may be configured to perform various operations (for example, receiving, obtaining, monitoring, outputting, transmitting) using or otherwise in cooperation with the receiver 1310, the transmitter 1315, or both. For example, the communication manager 1320 may receive information from the receiver 1310, send information to the transmitter 1315, or be integrated in combination with the receiver 1310, the transmitter 1315, or both to obtain information, output information, or perform various other operations as described herein.

The communication manager 1320 may support wireless communication at a network entity in accordance with examples as disclosed herein. For example, the communication manager 1320 is capable of, configured to, or operable to support a means for transmitting, to a UE and in accordance with capability of the UE to receive downlink control channels that at least partially overlap in time and that are associated with scheduling downlink shared channels that at least partially overlap in time, a first downlink control information via a first transmission and reception point and over a first downlink control channel, and a second downlink control information via a second transmission and reception point and over a second downlink control channel, the first downlink control channel at least partially overlapping in time with the second downlink control channel, the first downlink control information scheduling a first downlink shared channel associated with the first transmission and reception point, the second downlink control information scheduling a second downlink shared channel associated with the second transmission and reception point. The communication manager 1320 is capable of, configured to, or operable to support a means for transmitting, to the UE, the first downlink shared channel via the first transmission and reception point in accordance with the first downlink control information and the second downlink shared channel via the second transmission and reception point in accordance with the second downlink control information.

By including or configuring the communication manager 1320 in accordance with examples as described herein, the device 1305 (for example, a processor controlling or otherwise coupled with the receiver 1310, the transmitter 1315, the communication manager 1320, or a combination thereof) may support techniques for reducing or preventing a delayed decoding and demodulation of PDSCHs, facilitating joint demodulation of PDSCHs and more efficient performance at the UE 115 or the network entity 105.

Figure 14:
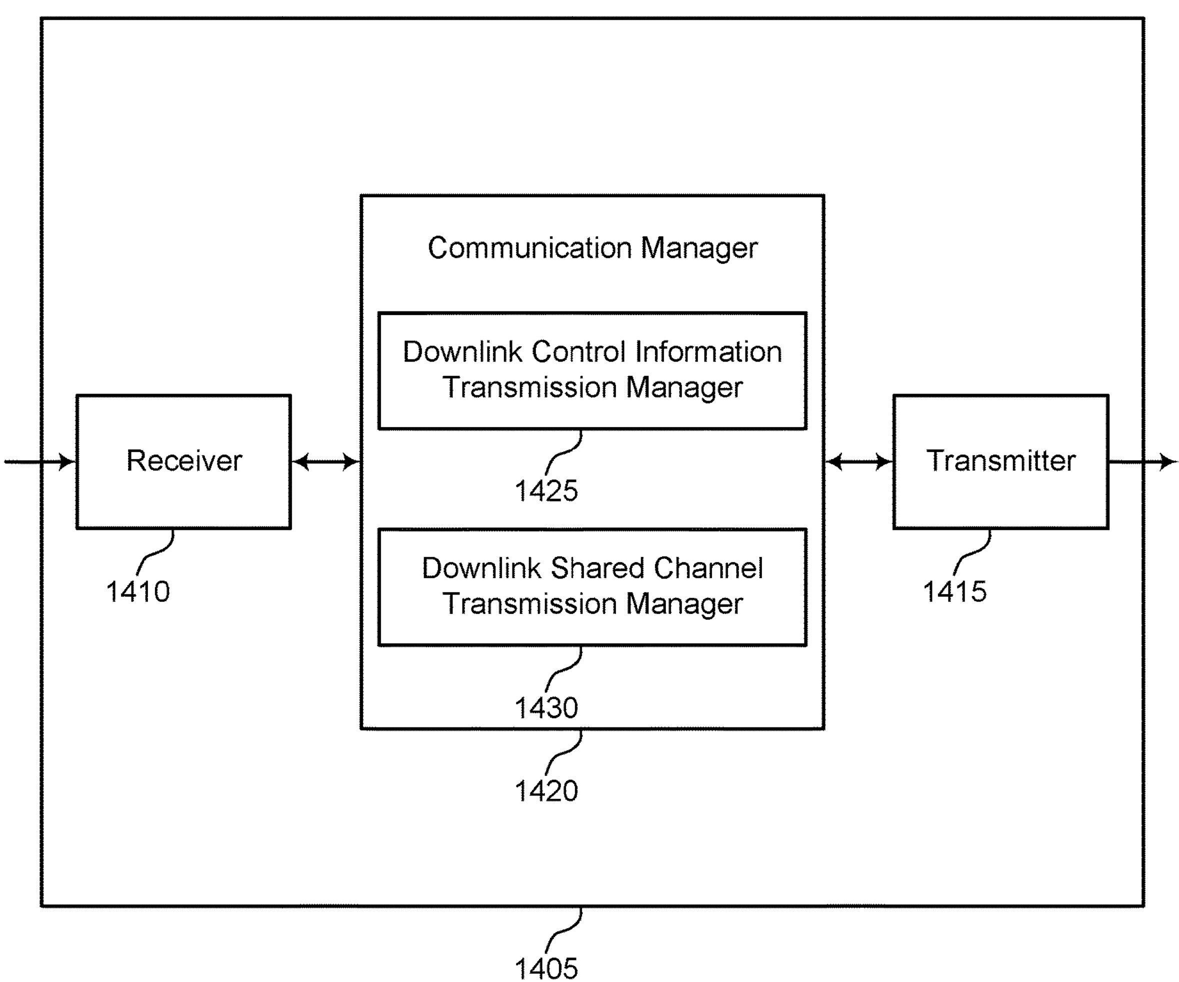

FIG. 14 shows a device 1405 that supports aligned downlink control channel reception in mDCI mTRP scenarios in accordance with aspects of the present disclosure. The device 1405 may be an example of aspects of a device 1305 or a network entity 105 as described herein. The device 1405 may include a receiver 1410, a transmitter 1415, and a communication manager 1420. The communication manager 1420 can be implemented, at least in part, by one or both of a modem and a processor. Each of these components may be in communication with one another (for example, via buses).

The receiver 1410 may provide a means for obtaining (for example, receiving, determining, identifying) information such as user data, control information, or any combination thereof (for example, I/Q samples, symbols, packets, protocol data units, service data units) associated with various channels (for example, control channels, data channels, information channels, channels associated with a protocol stack). Information may be passed on to other components of the device 1405. In some examples, the receiver 1410 may support obtaining information by receiving signals via antennas. Additionally, or alternatively, the receiver 1410 may support obtaining information by receiving signals via wired (for example, electrical, fiber optic) interfaces, wireless interfaces, or any combination thereof.

The transmitter 1415 may provide a means for outputting (for example, transmitting, providing, conveying, sending) information generated by other components of the device 1405. For example, the transmitter 1415 may output information such as user data, control information, or any combination thereof (for example, I/Q samples, symbols, packets, protocol data units, service data units) associated with various channels (for example, control channels, data channels, information channels, channels associated with a protocol stack). In some examples, the transmitter 1415 may support outputting information by transmitting signals via antennas. Additionally, or alternatively, the transmitter 1415 may support outputting information by transmitting signals via wired (for example, electrical, fiber optic) interfaces, wireless interfaces, or any combination thereof. In some examples, the transmitter 1415 and the receiver 1410 may be co-located in a transceiver, which may include or be coupled with a modem.

The device 1405, or various components thereof, may be an example of means for performing various aspects of aligned downlink control channel reception in mDCI mTRP scenarios as described herein. For example, the communication manager 1420 may include a downlink control information transmission manager 1425 a downlink shared channel transmission manager 1430, or any combination thereof. In some examples, the communication manager 1420, or various components thereof, may be configured to perform various operations (for example, receiving, obtaining, monitoring, outputting, transmitting) using or otherwise in cooperation with the receiver 1410, the transmitter 1415, or both. For example, the communication manager 1420 may receive information from the receiver 1410, send information to the transmitter 1415, or be integrated in combination with the receiver 1410, the transmitter 1415, or both to obtain information, output information, or perform various other operations as described herein.

The communication manager 1420 may support wireless communication at a network entity in accordance with examples as disclosed herein. The downlink control information transmission manager 1425 is capable of, configured to, or operable to support a means for transmitting, to a UE and in accordance with capability of the UE to receive downlink control channels that at least partially overlap in time and that are associated with scheduling downlink shared channels that at least partially overlap in time, a first downlink control information via a first transmission and reception point and over a first downlink control channel, and a second downlink control information via a second transmission and reception point and over a second downlink control channel, the first downlink control channel at least partially overlapping in time with the second downlink control channel, the first downlink control information scheduling a first downlink shared channel associated with the first transmission and reception point, the second downlink control information scheduling a second downlink shared channel associated with the second transmission and reception point. The downlink shared channel transmission manager 1430 is capable of, configured to, or operable to support a means for transmitting, to the UE, the first downlink shared channel via the first transmission and reception point in accordance with the first downlink control information and the second downlink shared channel via the second transmission and reception point in accordance with the second downlink control information.

Figure 15:
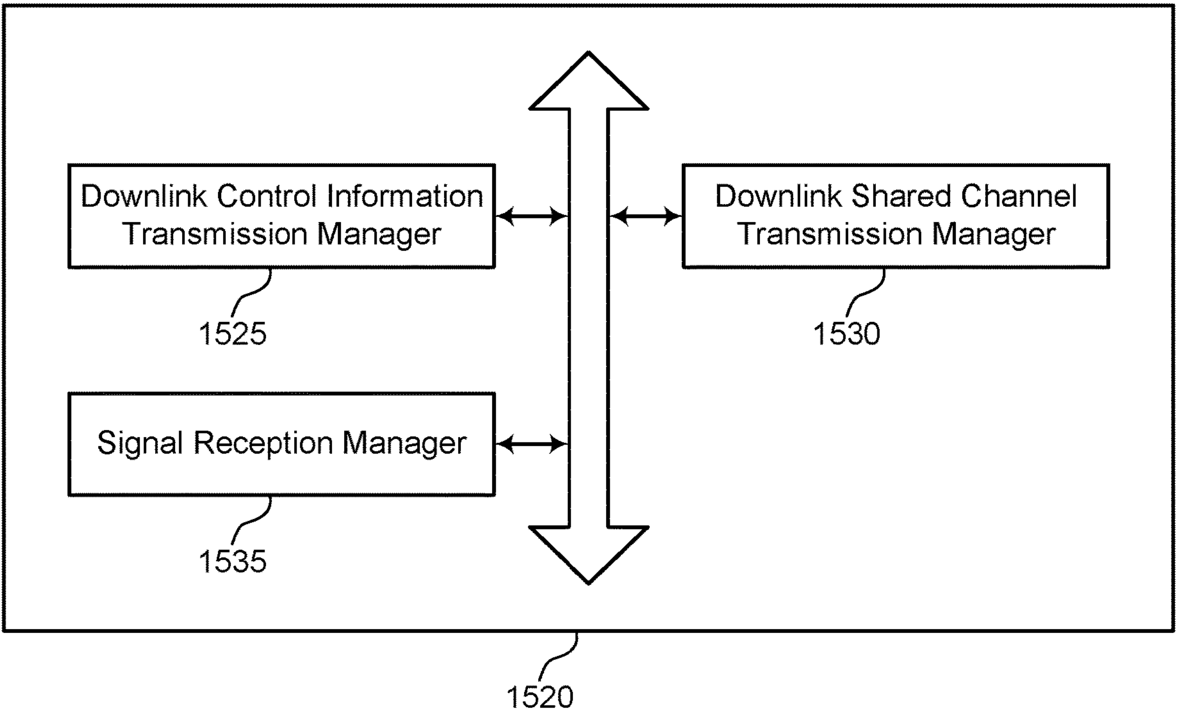
FIG. 15 shows a communication manager that supports aligned downlink control channel reception in mDCI mTRP scenarios in accordance with aspects of the present disclosure.

FIG. 15 shows a communication manager 1520 that supports aligned downlink control channel reception in mDCI mTRP scenarios in accordance with aspects of the present disclosure. The communication manager 1520, or various components thereof, may be an example of means for performing various aspects of aligned downlink control channel reception in mDCI mTRP scenarios as described herein. For example, the communication manager 1520 may include a downlink control information transmission manager 1525, a downlink shared channel transmission manager 1530, a signal reception manager 1535, or any combination thereof. Each of these components may communicate, directly or indirectly, with one another (for example, via buses) which may include communication within a protocol layer of a protocol stack, communication associated with a logical channel of a protocol stack (for example, between protocol layers of a protocol stack, within a device, component, or virtualized component associated with a network entity 105, between devices, components, or virtualized components associated with a network entity 105), or any combination thereof.

The communication manager 1520 may support wireless communication at a network entity in accordance with examples as disclosed herein. The downlink control information transmission manager 1525 is capable of, configured to, or operable to support a means for transmitting, to a UE and in accordance with capability of the UE to receive downlink control channels that at least partially overlap in time and that are associated with scheduling downlink shared channels that at least partially overlap in time, a first downlink control information via a first transmission and reception point and over a first downlink control channel, and a second downlink control information via a second transmission and reception point and over a second downlink control channel, the first downlink control channel at least partially overlapping in time with the second downlink control channel, the first downlink control information scheduling a first downlink shared channel associated with the first transmission and reception point, the second downlink control information scheduling a second downlink shared channel associated with the second transmission and reception point. The downlink shared channel transmission manager 1530 is capable of, configured to, or operable to support a means for transmitting, to the UE, the first downlink shared channel via the first transmission and reception point in accordance with the first downlink control information and the second downlink shared channel via the second transmission and reception point in accordance with the second downlink control information.

In some examples, a first search space set is associated with the first downlink control channel and a second search space set is associated with the second downlink control channel. In some examples, the first search space set is associated with a first control resource set having a same duration as a second control resource set associated with the second search space set. In some examples, the first search space set and the second search space set have a same slot periodicity and slot offset. In some examples, the first search space set and the second search space set have a same monitoring symbol within each slot. In some examples, the first downlink control channel in the first search space set and the second downlink control channel in the second search space set schedule the first downlink shared channel and the second downlink shared channel associated with a same time offset.

In some examples, the first search space set and the second search space set completely align in time.

In some examples, a first search space set is associated with the first downlink control channel and a second search space set is associated with the second downlink control channel. In some examples, the first search space set is associated with a first control resource set having a different duration than a second control resource set associated with the second search space set. In some examples, the first search space set and the second search space set have a same slot periodicity and slot offset. In some examples, the first downlink control channel in the first search space set and the second downlink control channel in the second search space set schedule the first downlink shared channel and the second downlink shared channel associated with a same time offset.

In some examples, each slot of the first search space set and each slot of the second search space set includes a single monitoring symbol in a same downlink control channel monitoring occasion.

In some examples, a first search space set is associated with the first downlink control channel and a second search space set is associated with the second downlink control channel. In some examples, the first search space set is associated with a first control resource set having a different duration than a second control resource set associated with the second search space set. In some examples, the first search space set and the second search space set have a different slot periodicity. In some examples, the first downlink control channel in the first search space set and the second downlink control channel in the second search space set schedule the first downlink shared channel and the second downlink shared channel associated with a same time offset.

In some examples, a monitoring symbol of the first search space set at least partially overlaps in time with the monitoring symbol of the second search space set.

In some examples, a last orthogonal frequency division multiplexing symbol of the first downlink control information is within a threshold symbol quantity of a last orthogonal frequency division multiplexing symbol of the second downlink control information.

In some examples, the signal reception manager 1535 is capable of, configured to, or operable to support a means for receiving, from the UE, signaling indicative of the capability of the UE.

In some examples, the first downlink shared channel and the second downlink shared channel completely align in time and frequency.

In some examples, the first downlink shared channel is transmitted via a first set of frequency resources and the second downlink shared channel is transmitted via a second set of frequency resources different than the first set of frequency resources, the first set frequency resources and the second set of frequency resources partially or fully overlapping in frequency.

In some examples, the first downlink shared channel and the second downlink shared channel partially overlap in frequency.

FIG. 16 shows a system including a device 1605 that supports aligned downlink control channel reception in mDCI mTRP scenarios in accordance with aspects of the present disclosure. The device 1605 may be an example of or include the components of a device 1305, a device 1405, or a network entity 105 as described herein. The device 1605 may communicate with network entities 105, UEs 115, or any combination thereof, which may include communication over wired interfaces, over wireless interfaces, or any combination thereof. The device 1605 may include components that support outputting and obtaining communication, such as a communication manager 1620, a transceiver 1610, an antenna 1615, a memory 1625, code 1630, and a processor 1635. These components may be in electronic communication or otherwise coupled (for example, operatively, communicatively, functionally, electronically, electrically) via buses (for example, a bus 1640).

The transceiver 1610 may support bi-directional communication via wired links, wireless links, or both as described herein. In some examples, the transceiver 1610 may include a wired transceiver and may communicate bi-directionally with another wired transceiver. Additionally, or alternatively, in some examples, the transceiver 1610 may include a wireless transceiver and may communicate bi-directionally with another wireless transceiver. In some examples, the device 1605 may include antennas 1615, which may be capable of transmitting or receiving wireless transmissions (for example, concurrently). The transceiver 1610 may also include a modem to modulate signals, to provide the modulated signals for transmission (for example, by antennas 1615, by a wired transmitter), to receive modulated signals (for example, from antennas 1615, from a wired receiver), and to demodulate signals. In some implementations, the transceiver 1610 may include interfaces, such as interfaces coupled with the antennas 1615 that are configured to support various receiving or obtaining operations, or interfaces coupled with the antennas 1615 that are configured to support various transmitting or outputting operations, or a combination thereof. In some implementations, the transceiver 1610 may include or be configured for coupling with processors or memory components that are operable to perform or support operations in accordance with received or obtained information or signals, or to generate information or other signals for transmission or other outputting, or any combination thereof. In some implementations, the transceiver 1610, or the transceiver 1610 and the antennas 1615, or the transceiver 1610 and the antennas 1615 and processors or memory components (for example, the processor 1635, or the memory 1625, or both), may be included in a chip or chip assembly that is installed in the device 1605. In some examples, the transceiver may be operable to support communication via communication links (for example, a communication link 125, a backhaul communication link 120, a midhaul communication link 162, a fronthaul communication link 168).

The memory 1625 may include RAM and ROM. The memory 1625 may store computer-readable, computer-executable code 1630 including instructions that, when executed by the processor 1635, cause the device 1605 to perform various functions described herein. The code 1630 may be stored in a non-transitory computer-readable medium such as system memory or another type of memory. In some cases, the code 1630 may not be directly executable by the processor 1635 but may cause a computer (for example, when compiled and executed) to perform functions described herein. In some cases, the memory 1625 may contain, among other things, a BIOS, which may control basic hardware or software operation such as the interaction with peripheral components or devices.

The processor 1635 may include an intelligent hardware device (for example, a general-purpose processor, a DSP, an ASIC, a CPU, an FPGA, a microcontroller, a programmable logic device, discrete gate or transistor logic, a discrete hardware component, or any combination thereof). In some cases, the processor 1635 may be configured to operate a memory array using a memory controller. In some other cases, a memory controller may be integrated into the processor 1635. The processor 1635 may be configured to execute computer-readable instructions stored in a memory (for example, the memory 1625) to cause the device 1605 to perform various functions (for example, functions or tasks supporting aligned downlink control channel reception in mDCI mTRP scenarios). For example, the device 1605 or a component of the device 1605 may include a processor 1635 and memory 1625 coupled with the processor 1635, the processor 1635 and memory 1625 configured to perform various functions described herein. The processor 1635 may be an example of a cloud-computing platform (for example, physical nodes and supporting software such as operating systems, virtual machines, or container instances) that may host the functions (for example, by executing code 1630) to perform the functions of the device 1605. The processor 1635 may be any suitable processors capable of executing scripts or instructions of software programs stored in the device 1605 (such as within the memory 1625). In some implementations, the processor 1635 may be a component of a processing system. A processing system may generally refer to a system or series of machines or components that receives inputs and processes the inputs to produce a set of outputs (which may be passed to other systems or components of, for example, the device 1605). For example, a processing system of the device 1605 may refer to a system including the various other components or subcomponents of the device 1605, such as the processor 1635, or the transceiver 1610, or the communication manager 1620, or other components or combinations of components of the device 1605. The processing system of the device 1605 may interface with other components of the device 1605, and may process information received from other components (such as inputs or signals) or output information to other components. For example, a chip or modem of the device 1605 may include a processing system and interfaces to output information, or to obtain information, or both. The interfaces may be implemented as or otherwise include a first interface configured to output information and a second interface configured to obtain information, or a same interface configured to output information and to obtain information, among other implementations. In some implementations, the interfaces may refer to an interface between the processing system of the chip or modem and a transmitter, such that the device 1605 may transmit information output from the chip or modem. Additionally, or alternatively, in some implementations, the interfaces may refer to an interface between the processing system of the chip or modem and a receiver, such that the device 1605 may obtain information or signal inputs, and the information may be passed to the processing system. A person having ordinary skill in the art will readily recognize that a first interface also may obtain information or signal inputs, and a second interface also may output information or signal outputs.

In some examples, a bus 1640 may support communication of (for example, within) a protocol layer of a protocol stack. In some examples, a bus 1640 may support communication associated with a logical channel of a protocol stack (for example, between protocol layers of a protocol stack), which may include communication performed within a component of the device 1605, or between different components of the device 1605 that may be co-located or located in different locations (for example, in which the device 1605 may refer to a system in which of the communication manager 1620, the transceiver 1610, the memory 1625, the code 1630, and the processor 1635 may be located in one of the different components or divided between different components).

In some examples, the communication manager 1620 may manage aspects of communication with a core network 130 (for example, via wired or wireless backhaul links). For example, the communication manager 1620 may manage the transfer of data communication for client devices, such as UEs 115. In some examples, the communication manager 1620 may manage communication with other network entities 105, and may include a controller or scheduler for controlling communication with UEs 115 in cooperation with other network entities 105. In some examples, the communication manager 1620 may support an X2 interface within an LTE/LTE-A wireless communication network technology to provide communication between network entities 105.

The communication manager 1620 may support wireless communication at a network entity in accordance with examples as disclosed herein. For example, the communication manager 1620 is capable of, configured to, or operable to support a means for transmitting, to a UE, and in accordance with capability of the UE to receive downlink control channels that at least partially overlap in time and that are associated with scheduling downlink shared channels that at least partially overlap in time, a first downlink control information via a first transmission and reception point and over a first downlink control channel, and a second downlink control information via a second transmission and reception point and over a second downlink control channel, the first downlink control channel at least partially overlapping in time with the second downlink control channel, the first downlink control information scheduling a first downlink shared channel associated with the first transmission and reception point, the second downlink control information scheduling a second downlink shared channel associated with the second transmission and reception point. The communication manager 1620 is capable of, configured to, or operable to support a means for transmitting, to the UE, the first downlink shared channel via the first transmission and reception point in accordance with the first downlink control information and the second downlink shared channel via the second transmission and reception point in accordance with the second downlink control information.

By including or configuring the communication manager 1620 in accordance with examples as described herein, the device 1605 may support techniques for reducing or preventing a delayed decoding and demodulation of PDSCHs, facilitating joint demodulation of PDSCHs and more efficient performance at the UE 115 or the network entity 105.

In some examples, the communication manager 1620 may be configured to perform various operations (for example, receiving, obtaining, monitoring, outputting, transmitting) using or otherwise in cooperation with the transceiver 1610, the antennas 1615 (for example, where applicable), or any combination thereof. Although the communication manager 1620 is illustrated as a separate component, in some examples, functions described with reference to the communication manager 1620 may be supported by or performed by the transceiver 1610, the processor 1635, the memory 1625, the code 1630, or any combination thereof. For example, the code 1630 may include instructions executable by the processor 1635 to cause the device 1605 to perform various aspects of aligned downlink control channel reception in mDCI mTRP scenarios as described herein, or the processor 1635 and the memory 1625 may be otherwise configured to perform or support such operations.

FIG. 17 shows a flowchart illustrating a method 1700 that supports aligned downlink control channel reception in mDCI mTRP scenarios in accordance with aspects of the present disclosure. The operations of the method 1700 may be implemented by a UE or its components as described herein. For example, the operations of the method 1700 may be performed by a UE 115 as described with reference to FIG. 1-12. In some examples, a UE may execute a set of instructions to control the functional elements of the wireless UE to perform the described functions. Additionally, or alternatively, the wireless UE may perform aspects of the described functions using special-purpose hardware.

At 1705, the method may include receiving, in accordance with a capability of the UE to receive downlink control channels that at least partially overlap in time and that are associated with scheduling downlink shared channels that at least partially overlap in time, first downlink control information over a first downlink control channel associated with a first transmission and reception point, and second downlink control information over a second downlink control channel associated with a second transmission and reception point, the first downlink control channel at least partially overlapping in time with the second downlink control channel, the first downlink control information scheduling a first downlink shared channel associated with the first transmission and reception point, and the second downlink control information scheduling a second downlink shared channel associated with the second transmission and reception point. The operations of 1705 may be performed in accordance with examples as disclosed herein. In some examples, aspects of the operations of 1705 may be performed by a downlink control information reception manager 1125 as described with reference to FIG. 11.

At 1710, the method may include receiving the first downlink shared channel associated with the first transmission and reception point in accordance with the first downlink control information and the second downlink shared channel associated with the second transmission and reception point in accordance with the second downlink control information, the first downlink shared channel at least partially overlapping with the second downlink shared channel in time. The operations of 1710 may be performed in accordance with examples as disclosed herein. In some examples, aspects of the operations of 1710 may be performed by a downlink shared channel control reception manager 1130 as described with reference to FIG. 11.

At 1715, the method may include performing joint demodulation of the first downlink shared channel and the second downlink shared channel. The operations of 1715 may be performed in accordance with examples as disclosed herein. In some examples, aspects of the operations of 1715 may be performed by a joint demodulation manager 1135 as described with reference to FIG. 11.

FIG. 18 shows a flowchart illustrating a method 1800 that supports aligned downlink control channel reception in mDCI mTRP scenarios in accordance with aspects of the present disclosure. The operations of the method 1800 may be implemented by a network entity or its components as described herein. For example, the operations of the method 1800 may be performed by a network entity as described with reference to FIGS. 1-8 and 13-16. In some examples, a network entity may execute a set of instructions to control the functional elements of the wireless network entity to perform the described functions. Additionally, or alternatively, the wireless network entity may perform aspects of the described functions using special-purpose hardware.

At 1805, the method may include transmitting, to a UE, and in accordance with capability of the UE to receive downlink control channels that at least partially overlap in time and that are associated with scheduling downlink shared channels that at least partially overlap in time, a first downlink control information via a first transmission and reception point and over a first downlink control channel, and a second downlink control information via a second transmission and reception point and over a second downlink control channel, the first downlink control channel at least partially overlapping in time with the second downlink control channel, the first downlink control information scheduling a first downlink shared channel associated with the first transmission and reception point, the second downlink control information scheduling a second downlink shared channel associated with the second transmission and reception point. The operations of 1805 may be performed in accordance with examples as disclosed herein. In some examples, aspects of the operations of 1805 may be performed by a downlink control information transmission manager 1525 as described with reference to FIG. 15.

At 1810, the method may include transmitting, to the UE, the first downlink shared channel via the first transmission and reception point in accordance with the first downlink control information and the second downlink shared channel via the second transmission and reception point in accordance with the second downlink control information. The operations of 1810 may be performed in accordance with examples as disclosed herein. In some examples, aspects of the operations of 1810 may be performed by a downlink shared channel transmission manager 1530 as described with reference to FIG. 15.

The following provides an overview of aspects of the present disclosure:

Aspect 1: A method for wireless communication at a UE, comprising: receiving, in accordance with a capability of the UE to receive downlink control channels that at least partially overlap in time and that are associated with scheduling downlink shared channels that at least partially overlap in time, first DCI over a first downlink control channel associated with a first TRP, and second DCI over a second downlink control channel associated with a second TRP, the first downlink control channel at least partially overlapping in time with the second downlink control channel, the first DCI scheduling a first downlink shared channel associated with the first TRP, and the second DCI scheduling a second downlink shared channel associated with the second TRP; receiving the first downlink shared channel associated with the first TRP in accordance with the first DCI and the second downlink shared channel associated with the second TRP in accordance with the second DCI, the first downlink shared channel at least partially overlapping with the second downlink shared channel in time; and performing joint demodulation of the first downlink shared channel and the second downlink shared channel.

Aspect 2: The method of aspect 1, wherein receiving the first DCI and the second DCI comprises: monitoring a first search space set for the first downlink control channel and a second search space set for the second downlink control channel, wherein the first search space set is associated with a first control resource set having a same duration as a second control resource set associated with the second search space set, wherein the first search space set and the second search space set have a same slot periodicity and slot offset, wherein the first search space set and the second search space set have a same monitoring symbol within each slot, and wherein the first downlink control channel in the first search space set and the second downlink control channel in the second search space set schedule the first downlink shared channel and the second downlink shared channel associated with a same time offset.

Aspect 3: The method of aspect 2, wherein the first search space set and the second search space set completely align in time.

Aspect 4: The method of aspect 1, wherein receiving the first DCI and the second DCI comprises: monitoring a first search space set for the first downlink control channel and a second search space set for the second downlink control channel, wherein the first search space set is associated with a first control resource set having a different duration than a second control resource set associated with the second search space set, wherein the first search space set and the second search space set have a same slot periodicity and slot offset, and wherein the first downlink control channel in the first search space set and the second downlink control channel in the second search space set schedule the first downlink shared channel and the second downlink shared channel associated with a same time offset.

Aspect 5: The method of aspect 4, wherein each slot of the first search space set and each slot of the second search space set includes a single monitoring symbol in a same downlink control channel monitoring occasion.

Aspect 6: The method of any of aspects 4 through 5, wherein a last orthogonal frequency division multiplexing symbol of the first DCI is within a threshold symbol quantity of a last orthogonal frequency division multiplexing symbol of the second DCI.

Aspect 7: The method of aspect 1, wherein receiving the first DCI and the second DCI comprises: monitoring a first search space set for the first downlink control channel and a second search space set for the second downlink control channel, wherein the first search space set is associated with a first control resource set having a different duration than a second control resource set associated with the second search space set, wherein the first search space set and the second search space set have a different slot periodicity, and wherein the first downlink control channel in the first search space set and the second downlink control channel in the second search space set schedule the first downlink shared channel and the second downlink shared channel associated with a same time offset.

Aspect 8: The method of aspect 7, wherein at least one monitoring symbol of the first search space set at least partially overlaps in time with at least one monitoring symbol of the second search space set.

Aspect 9: The method of any of aspects 1 through 8, further comprising transmitting, to a network entity associated with the first TRP and the second TRP, signaling indicative of the capability of the UE.

Aspect 10: The method of any of aspects 1 through 9, wherein the first downlink shared channel and the second downlink shared channel completely align in time and frequency.

Aspect 11: The method of any of aspects 1 through 9, wherein the first downlink shared channel is received via a first set of frequency resources and the second downlink shared channel is received via a second set of frequency resources different than the first set of frequency resources.

Aspect 12:1 through 9, wherein the first downlink shared channel and the second downlink shared channel partially overlap in frequency.

Aspect 13: A method for wireless communication at a network entity, comprising: transmitting, to a UE, and in accordance with capability of the UE to receive downlink control channels that at least partially overlap in time and that are associated with scheduling downlink shared channels that at least partially overlap in time, a first DCI via a first TRP and over a first downlink control channel, and a second DCI via a second TRP and over a second downlink control channel, the first downlink control channel at least partially overlapping in time with the second downlink control channel, the first DCI scheduling a first downlink shared channel associated with the first TRP, the second DCI scheduling a second downlink shared channel associated with the second TRP; and transmitting, to the UE, the first downlink shared channel via the first TRP in accordance with the first DCI and the second downlink shared channel via the second TRP in accordance with the second DCI.

Aspect 14: The method of aspect 13, wherein a first search space set is associated with the first downlink control channel and a second search space set is associated with the second downlink control channel, the first search space set is associated with a first control resource set having a same duration as a second control resource set associated with the second search space set, the first search space set and the second search space set have a same slot periodicity and slot offset, the first search space set and the second search space set have a same monitoring symbol within each slot, and the first downlink control channel in the first search space set and the second downlink control channel in the second search space set schedule the first downlink shared channel and the second downlink shared channel associated with a same time offset.

Aspect 15: The method of aspect 14, wherein the first search space set and the second search space set completely align in time.

Aspect 16: The method of aspect 14, wherein a first search space set is associated with the first downlink control channel and a second search space set is associated with the second downlink control channel, the first search space set is associated with a first control resource set having a different duration than a second control resource set associated with the second search space set, the first search space set and the second search space set have a same slot periodicity and slot offset, and the first downlink control channel in the first search space set and the second downlink control channel in the second search space set schedule the first downlink shared channel and the second downlink shared channel associated with a same time offset.

Aspect 17: The method of aspect 16, wherein each slot of the first search space set and each slot of the second search space set includes a single monitoring symbol in a same downlink control channel monitoring occasion.

Aspect 18: The method of any of aspects 16 through 17, wherein a last orthogonal frequency division multiplexing symbol of the first DCI is within a threshold symbol quantity of a last orthogonal frequency division multiplexing symbol of the second DCI.

Aspect 19: The method of aspect 14, wherein a first search space set is associated with the first downlink control channel and a second search space set is associated with the second downlink control channel, the first search space set is associated with a first control resource set having a different duration than a second control resource set associated with the second search space set, the first search space set and the second search space set have a different slot periodicity, and the first downlink control channel in the first search space set and the second downlink control channel in the second search space set schedule the first downlink shared channel and the second downlink shared channel associated with a same time offset.

Aspect 20: The method of aspect 19, wherein at least one monitoring symbol of the first search space set at least partially overlaps in time with at least one monitoring symbol of the second search space set.

Aspect 21: The method of any of aspects 13 through 20, further comprising receiving, from the UE, signaling indicative of the capability of the UE.

Aspect 22: The method of any of aspects 13 through 21, wherein the first downlink shared channel and the second downlink shared channel completely align in time and frequency.

Aspect 23: The method of any of aspects 13 through 21, wherein the first downlink shared channel is transmitted via a first set of frequency resources and the second downlink shared channel is transmitted via a second set of frequency resources different than the first set of frequency resources.

Aspect 24: The method of any of aspects 13 through 21, wherein the first downlink shared channel and the second downlink shared channel partially overlap in frequency.

Aspect 25: An apparatus for wireless communication at a UE, comprising a processor; memory coupled with the processor; and instructions stored in the memory and executable by the processor to cause the apparatus to perform a method of any of aspects 1 through 12.

Aspect 26: An apparatus for wireless communication at a UE, comprising at least one means for performing a method of any of aspects 1 through 12.

Aspect 27: A non-transitory computer-readable medium storing code for wireless communication at a UE, the code comprising instructions executable by a processor to perform a method of any of aspects 1 through 12.

Aspect 28: An apparatus for wireless communication at a network entity, comprising a processor; memory coupled with the processor; and instructions stored in the memory and executable by the processor to cause the apparatus to perform a method of any of aspects 13 through 24.

Aspect 29: An apparatus for wireless communication at a network entity, comprising at least one means for performing a method of any of aspects 13 through 24.

Aspect 30: A non-transitory computer-readable medium storing code for wireless communication at a network entity, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communication systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (for example, a combination of a DSP and a microprocessor, multiple microprocessors, microprocessors in conjunction with a DSP core, or any other such configuration).

The functions described herein may be implemented using hardware, software executed by a processor, firmware, or any combination thereof. If implemented using software executed by a processor, the functions may be stored as or transmitted using instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. Examples in which software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, "determining" can include calculating, computing, processing, deriving, investigating, looking up (such as via looking up in a table, a database or another data structure), and ascertaining among other examples. Also, "determining" can include receiving (for example, receiving information) and accessing (for example, accessing data stored in memory) among other examples. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. The disclosure is not limited to the examples and designs described herein but is to be accorded the broadest scope consistent with the principles and novel features disclosed herein.

What is claimed is:

1. A method for wireless communication at a user equipment (UE), comprising:

receiving, in accordance with a capability of the UE to receive downlink control channels that at least partially overlap in time and that are associated with scheduling downlink shared channels that at least partially overlap in time, first downlink control information over a first downlink control channel associated with a first transmission and reception point, and second downlink control information over a second downlink control channel associated with a second transmission and reception point, the first downlink control channel at least partially overlapping in time with the second downlink control channel, the first downlink control information scheduling a first downlink shared channel associated with the first transmission and reception point, and the second downlink control information scheduling a second downlink shared channel associated with the second transmission and reception point, the receiving comprising:

monitoring a first search space set for the first downlink control channel and a second search space set for the second downlink control channel, the first search space set associated with a first control resource set and the second search space set associated with a second control resource set, and the first downlink shared channel and the second downlink shared channel associated with a same time offset;

receiving the first downlink shared channel associated with the first transmission and reception point in accordance with the first downlink control information and the second downlink shared channel associated with the second transmission and reception point in accordance with the second downlink control information, the first downlink shared channel at least partially overlapping with the second downlink shared channel in time; and performing joint demodulation of the first downlink shared channel and the second downlink shared channel.

2. The method of claim 1, wherein the first control resource set has a same duration as the second control resource set, wherein the first search space set and the second search space set have a same slot periodicity and slot offset, and wherein the first search space set and the second search space set have a same monitoring symbol within each slot.

3. The method of claim 2, wherein the first search space set and the second search space set completely align in time.

4. The method of claim 1, wherein the first control resource set has a different duration than the second control resource set associated with the second search space set, and wherein the first search space set and the second search space set have a same slot periodicity and slot offset.

5. The method of claim 4, wherein each slot of the first search space set and each slot of the second search space set includes a single monitoring symbol in a same downlink control channel monitoring occasion.

6. The method of claim 4, wherein a last orthogonal frequency division multiplexing symbol of the first downlink control information is within a threshold symbol quantity of a last orthogonal frequency division multiplexing symbol of the second downlink control information.

7. The method of claim 1, wherein the first control resource set has a different duration than the second control resource set, and wherein the first search space set and the second search space set have a different slot periodicity.

8. The method of claim 7, wherein at least one monitoring symbol of the first search space set at least partially overlaps in time with at least one monitoring symbol of the second search space set.

9. The method of claim 1, further comprising transmitting, to a network entity associated with the first transmission and reception point and the second transmission and reception point, signaling indicative of the capability of the UE.

10. The method of claim 1, wherein the first downlink shared channel and the second downlink shared channel completely align in time and frequency.

11. The method of claim 1, wherein the first downlink shared channel is received via a first set of frequency resources and the second downlink shared channel is received via a second set of frequency resources different than the first set of frequency resources.

12. The method of claim 1, wherein the first downlink shared channel and the second downlink shared channel partially overlap in frequency.

13. A method for wireless communication at a network entity, comprising:

transmitting, to a user equipment (UE), and in accordance with capability of the UE to receive downlink control channels that at least partially overlap in time and that are associated with scheduling downlink shared channels that at least partially overlap in time, a first downlink control information via a first transmission and reception point and over a first downlink control channel, and a second downlink control information via a second transmission and reception point and over a second downlink control channel, the first downlink control channel at least partially overlapping in time with the second downlink control channel, the first downlink control information scheduling a first downlink shared channel associated with the first transmission and reception point, the second downlink control information scheduling a second downlink shared channel associated with the second transmission and reception point, the first downlink control channel associated with a first search space set and the second downlink control channel associated with a second search space set, the first search space set associated with a first control resource set and the second search space set associated with a second control resource set, and the first downlink shared channel and the second downlink shared channel associated with a same time offset; and transmitting, to the UE, the first downlink shared channel via the first transmission and reception point in accordance with the first downlink control information and the second downlink shared channel via the second transmission and reception point in accordance with the second downlink control information.

14. The method of claim 13, wherein:

the first control resource set has a same duration as the second control resource set, the first search space set and the second search space set have a same slot periodicity and slot offset, and the first search space set and the second search space set have a same monitoring symbol within each slot.

15. The method of claim 14, wherein the first search space set and the second search space set completely align in time.

16. The method of claim 13, wherein:

the first control resource set has a different duration than the second control resource set, and the first search space set and the second search space set have a same slot periodicity and slot offset.

17. The method of claim 16, wherein each slot of the first search space set and each slot of the second search space set includes a single monitoring symbol in a same downlink control channel monitoring occasion.

18. The method of claim 16, wherein a last orthogonal frequency division multiplexing symbol of the first downlink control information is within a threshold symbol quantity of a last orthogonal frequency division multiplexing symbol of the second downlink control information.

19. The method of claim 13, wherein:

the first control resource set having has a different duration than the second control resource set, and the first search space set and the second search space set have a different slot periodicity.

20. The method of claim 19, wherein at least one monitoring symbol of the first search space set at least partially overlaps in time with at least one monitoring symbol of the second search space set.

21. The method of claim 13, further comprising receiving, from the UE, signaling indicative of the capability of the UE.

22. The method of claim 13, wherein the first downlink shared channel and the second downlink shared channel completely align in time and frequency.

23. The method of claim 13, wherein the first downlink shared channel is transmitted via a first set of frequency resources and the second downlink shared channel is transmitted via a second set of frequency resources different than the first set of frequency resources.

24. The method of claim 13, wherein the first downlink shared channel and the second downlink shared channel partially overlap in frequency.

25. A user equipment (UE) for wireless communication, comprising:

at least one processor; and at least one memory coupled with the at least one processor and storing instructions executable by the at least one processor to cause the UE to:

receive, in accordance with a capability of the UE to receive downlink control channels that at least partially overlap in time and that are associated with scheduling downlink shared channels that at least partially overlap in time, first downlink control information over a first downlink control channel associated with a first transmission and reception point, and second downlink control information over a second downlink control channel associated with a second transmission and reception point, the first downlink control channel at least partially overlapping in time with the second downlink control channel, the first downlink control information scheduling a first downlink shared channel associated with the first transmission and reception point, and the second downlink control information scheduling a second downlink shared channel associated with the second transmission and reception point, the instructions to receive executable by the at least one processor to cause the UE to:

monitor a first search space set for the first downlink control channel and a second search space set for the second downlink control channel, the first search space set associated with a first control resource set and the second search space set associated with a second control resource set, and the first downlink shared channel and the second downlink shared channel associated with a same time offset;

receive the first downlink shared channel associated with the first transmission and reception point in accordance with the first downlink control information and the second downlink shared channel associated with the second transmission and reception point in accordance with the second downlink control information, the first downlink shared channel at least partially overlapping with the second downlink shared channel in time; and perform joint demodulation of the first downlink shared channel and the second downlink shared channel.

26. The UE of claim 25, wherein the first control resource set has a same duration as the second control resource set, wherein the first search space set and the second search space set have a same slot periodicity and slot offset, and wherein the first search space set and the second search space set have a same monitoring symbol within each slot.

27. The UE of claim 25, wherein the first control resource set has a different duration than the second control resource set associated with the second search space set, and wherein the first search space set and the second search space set have a same slot periodicity and slot offset.

28. A network entity for wireless communication, comprising:

at least one processor; and at least one memory coupled with the at least one processor and storing instructions executable by the at least one processor to cause the network entity to:

transmit, to a user equipment (UE), and in accordance with capability of the UE to receive downlink control channels that at least partially overlap in time and that are associated with scheduling downlink shared channels that at least partially overlap in time, a first downlink control information via a first transmission and reception point and over a first downlink control channel, and a second downlink control information via a second transmission and reception point and over a second downlink control channel, the first downlink control channel at least partially overlapping in time with the second downlink control channel, the first downlink control information scheduling a first downlink shared channel associated with the first transmission and reception point, the second downlink control information scheduling a second downlink shared channel associated with the second transmission and reception point, the first downlink control channel associated with a first search space set and the second downlink control channel associated with a second search space set, the first search space set associated with a first control resource set and the second search space set associated with a second control resource set, and the first downlink shared channel and the second downlink shared channel associated with a same time offset; and transmit, to the UE, the first downlink shared channel via the first transmission and reception point in accordance with the first downlink control information and the second downlink shared channel via the second transmission and reception point in accordance with the second downlink control information.

29. The network entity of claim 28, wherein:

the first control resource set has a same duration as the second control resource set, the first search space set and the second search space set have a same slot periodicity and slot offset, and the first search space set and the second search space set have a same monitoring symbol within each slot.

30. The network entity of claim 28, wherein:

the first control resource set has a different duration than the second control resource set, and the first search space set and the second search space set have a same slot periodicity and slot offset.

* * * * *